(12) United States Patent
Kadono

(10) Patent No.: US 6,590,936 B1
(45) Date of Patent: Jul. 8, 2003

(54) CODED DATA TRANSFORM METHOD, TRANSCODING METHOD, TRANSCODING SYSTEM, AND DATA STORAGE MEDIA

(75) Inventor: Shinya Kadono, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/549,380

(22) Filed: Apr. 13, 2000

(30) Foreign Application Priority Data

Apr. 13, 1999 (JP) .......................................... 11-105781
Nov. 9, 1999 (JP) .......................................... 11-318715

(51) Int. Cl.$^7$ .......................... H04N 7/12; H04N 11/02; H04N 11/04

(52) U.S. Cl. ............................. 375/240.12; 375/240.03

(58) Field of Search ..................... 375/204.02, 240.03, 375/240.04, 240.05, 240.12, 240.13, 240.22, 240.18; H04N 7/12, 11/02, 11/04

(56) References Cited

U.S. PATENT DOCUMENTS

| | | | | |
|---|---|---|---|---|
| 5,537,440 A | * | 7/1996 | Eyuboglu et al. | 375/240.03 |
| 5,657,015 A | * | 8/1997 | Nakajima et al. | 341/61 |
| 5,870,146 A | * | 2/1999 | Zhu | 375/240.03 |
| 6,167,088 A | * | 12/2000 | Sethuraman | 375/240.1 |
| 6,226,328 B1 | * | 5/2001 | Assuncao | 375/240.26 |
| 6,300,973 B1 | * | 10/2001 | Feder et al. | 348/14.09 |
| 6,314,138 B1 | * | 11/2001 | Lemaguet | 375/240 |

OTHER PUBLICATIONS

Gertjan Keesman et al., Transcoding of MPEG bitstreams, 1996, pp. 481–500.

Huifang Sun, et al., Architectures for MPEG Compressed Bitstream Scaling, Apr. 1996, pp. 191–199.

* cited by examiner

*Primary Examiner*—Nhon Diep
(74) *Attorney, Agent, or Firm*—Wenderoth, Lind & Ponack, L.L.P.

(57) ABSTRACT

A transcoding system comprises a decoding unit for receiving coded data which has been obtained by subjecting image data of each coding unit to a coding process including a first orthogonal transform process and a first quantization process, and decoding the input coded data for each coding unit to generate decoded data; and an encoding unit for coding the decoded data to generate transcoded data. The decoding unit includes an inverse quantizer for inversely quantizing quantized coefficients obtained from the input coded data, with a first quantization step which has been used in the first quantization process. The encoding unit includes a frequency transform unit for subjecting the decoded data to a second orthogonal transform process to generate frequency-domain data; and quantization means for subjecting the frequency-domain data to a second quantization process with a second quantization step which is derived on the basis of the transcoded data and the first quantization step. Therefore, under the restriction on the target number of bits in the transcoding process, the quantization step of the second quantization process can be set so that the quantization error is minimized, considering the non-linear relationship between the bit rate in the transcoding process and the quantization distortion (quantization error). Thereby, an increase in the quantization error due to the transcoding process can be effectively suppressed under the restriction on the bit rate.

16 Claims, 19 Drawing Sheets

CODED DATA TRANSFORM METHOD, TRANSCODING METHOD, TRANSCODING SYSTEM, AND DATA STORAGE MEDIA

FIELD OF THE INVENTION

The present invention relates to a coded data transform method, a transcoding method, and a transcoding system and, more particularly, to those for transforming coded data which has been obtained by subjecting a video signal to a coding process and stored in a data base or the like, into coded data which can be decoded by a receiver, according to a transcoding process using a coding method and coding parameters different from those of the coding process. The invention also relates to a data storage medium containing a program for executing the transcoding process by using software.

BACKGROUND OF THE INVENTION

In recent years, we have greeted the age of multimedia in which audio, video, and other data are integrally handled, and the conventional information media, i.e., means for transmitting information to people, such as newspapers, magazines, televisions, radios, and telephones, have been adopted as the targets of multimedia. Generally, "multimedia" means media in which, not only characters, but also diagrams, speeches, and especially images are simultaneously expressed in relation with each other. In order to handle the conventional information media as the targets of multimedia, it is necessary to express the information as data in digital formats (digital data).

When the quantity of data possessed by each of the above-described information media is estimated as the quantity of digital data, in the case of characters, the data quantity per character is only 1~2 byte. However, in the case of speech, the data quantity is 64 kbits per second (quality for telecommunication). Further, in the case of moving picture, the required data quantity is more than 100 Mbits per second (quality for current television broadcasting). In other words, it is not practical to handle the digital data such as video data having an enormous quantity, as it is, in the corresponding information media. For example, although visual telephones have already been put to practical use by ISDN (Integrated Services Digital Network) having a transmission rate of 64 kbps~1.5 Mbps, it is impossible to transmit digital video data corresponding to video output from a television camera as it is by ISDN.

As a result, data compression techniques are demanded. For example, for visual telephones, the video compression techniques based on the H.261 and H.263 standards which have been standardized by ITU-T (International Telecommunication Union—Telecommunication Sector) are employed. Further, according to the data compression technique based on the MPEG1 standard, it is possible to record video data as well as audio data in an ordinary music CD (compact disk).

MPEG (Moving Picture Experts Group) is an international standard relating to a compression technique for video data (image signal of moving picture), and MPEG1 is the standard for compressing video data to 1.5 Mbps, i.e., data of a television signal to about 1/100. Since the transmission rate of targets to which the MPEG1 standard is directed is limited to about 1.5 Mbps, in MPEG2 which has been standardized to meet the demand for higher image quality, video data is compressed to 2~15 Mbps.

MPEG2 is the most representative international standard relating to a digital image coding method, and MPEG2 is now rapidly spreading in the technical fields relating to digital TV broadcasting and digital video disks.

Furthermore, under the existing circumstances, standardization of a video data compression technique, which enables coding and signal processing in object units and realizes new fuctions required in the age of multimedia, is now proceeded as MPEG4 by the working group which has carried out standardization of MPEG1 and MPEG2 (ISO/IEC JTC1/SC29/WG11). MPEG4 was originally aimed at standardization of a coding method of low bit rate, but the target of standardization of MPEG4 is now extended to a more versatile coding method of higher bit rate which is adaptable to an interlace image.

Meanwhile, MPEG2 is a standard adapted to a versatile coding method, and it can be employed under different conditions according to various uses. The condition to employ MPEG2 depends on factors relating to the image quality, such as the number of pixels on a display, the bit rate of a coded image signal (bit stream), etc.

However, in each image processing equipment, since the performance of hardware is restricted by cost, a bit stream which stream which has been coded under predetermined conditions.

For example, a decoder of an ordinary definition television cannot decode a bit stream of a HDTV (High Definition Television) which is adapted to an image of high pixel rate.

On the other hand, supposing a recorder capable of recording a bit stream which has been obtained by coding an image signal with a bit rate of 6 Mbps, for a length equivalent to two hours of video, this recorder can achieve longer-hour recording of the bit stream for a length equivalent to four hours of video by compressing the input bit stream having the bit rate of 6 Mbps so that the bit stream becomes 3 Mbps.

Hence, there is a demand for a transcoding technique for transforming an MPEG2 bit stream inputted to each image processing equipment into an MPEG2 bit stream adapted to the performance of hardware or the use in the image processing equipment. In recent years, many reports of research performed on such transcoding techniques have been presented (e.g., Gertjan Keesman, Robert Hellinghuizen, Fokke Hoeksema, Geert Heideman, "Transcoding of MPEG bitstreams", Signal Processing: Image Communication, Vol. 8, 1966, pp. 481–500).

FIG. 20 is a block diagram for explaining a transcoding system 100a according to a prior art.

The transcoding system 100a comprises a decoding unit D1 and an encoding unit E1. The decoding unit D1 receives an MPEG2 bit stream Eg1 obtained by subjecting image data to a coding process based on MPEG2, and subjects the bit stream Eg1 to a decoding process, thereby generating decoded data Rg1. The encoding unit E1 subjects the decoded data Rg1 to a coding process based on MPEG2 under a condition different from that of the above-mentioned coding process, thereby generating transcoded data Eg2. The MPEG2 bit stream is obtained by coding image data for every image space as a coding unit (block) which comprises a predetermined number of pixels. Therefore, the decoding unit D1 performs the decoding process for the bit stream, block by block, and the encoding unit E1 performs the coding process for the decoded data Rg1, block by block.

Next, the structure of the decoding unit D1 will be described in detail.

The decoding unit D1 includes a VLD (Variable Length Decoding) unit 100 for subjecting the coded MPEG2 bit stream Eg1 to VLD; an inverse quantization unit 101 for subjecting the output Vg from the VLD 100 to inverse quantization; and an IDCT (Inverse Discrete Cosine Transform) unit 102 for subjecting the output IQg from the inverse quantization unit 101 to IDCT by which frequency-domain data is transformed to space-domain data. Further, the decoding unit D1 includes an adder 103 for adding the output data ITg from the IDCT unit 102 and its prediction data Mg1; and a frame memory 104 for storing the output Rg1 from the adder 103 as the prediction data Mg1. The output Rg1 from the adder 103 is output as the decoded data.

Next, the structure of the encoding unit E1 will be described in detail.

The encoding unit E1 includes a subtracter 105 for calculating a difference Dg between the output data Rg1 from the decoding unit D1 and its prediction data Mg2; a DCT (Discrete Cosine Transform) unit 106 for subjecting the output Dg from the subtracter 105 to DCT by which space-domain data is transformed to frequency-domain data; and a quantization unit 107 for subjecting the output Tg from the DCT unit 106 to quantization based on a quantization control signal Cq. Further, the encoding unit E1 includes a VLC (Variable-Length Coding) unit 112 for subjecting the output Qg from the quantization unit 107 to VLC; and a rate control unit 113 for outputting the quantization control signal Cq to the quantization unit 107 on the basis of the output Eg2 from the VLC unit 112. The output Eg2 from the VLC unit 112 is output as the transcoded data.

The rate control unit 113 calculates the target number of bits when coding the DCT output Tg corresponding to a block to be coded (target block), and outputs the obtained target number of bits as the quantization control signal Cq to the quantization unit 107.

Further, the encoding unit E1 includes an inverse quantization unit 108 for subjecting the output Qg from the quantization unit 107 to inverse quantization; and an IDCT unit 109 for subjecting the output IQg2 from the inverse quantization unit 108 to IDCT. Furthermore, the encoding unit E1 includes an adder 110 for adding the output data ITg2 from the IDCT unit 109 and its prediction data Mg2; and a frame memory 111 for storing the output Rg2 from the adder 110. The output Mg2 from the frame memory 111 is output as the prediction data.

FIG. 21 is a block diagram illustrating the quantization unit 107 in more detail. The quantization unit 107 comprises a quantization step derivation unit 200 for deriving a quantization step Qs2 on receipt of the target number of bits Cq from the rate control unit 113; and a quantizer 201 for quantizing the output Tg from the DCT unit 106 on the basis of the quantization step Qs2.

Next, the operation of the transcoding system 100a will be described.

Initially, coded data Eg1, which has been obtained by coding an image signal, is input to the decoding unit D1.

In the VLD unit 100, the coded data Eg1 is transformed to quantized coefficients Vg by variable-length decoding, and the quantized coefficients Vg are output to the inverse quantization unit 101. In the inverse quantization unit 101, the quantized coefficients Vg are subjected to inverse quantization based on the quantization step used in the coding process for the image signal, whereby frequency components IQg are restored. The frequency components IQg are transformed to space-domain data ITg by IDCT (Inverse Discrete Cosine Transform) in the IDCT unit 102. When the space-domain data ITg is input to the adder 103, addition of the space-domain data ITg and the prediction data Mg1 is performed, resulting in reproduced data Rg1. The reproduced data Rg1 is output as decoded data from the decoding unit D1 and, on the other hand, it is stored in the frame memory 104 as already-decoded image data (prediction data) Mg1.

Next, the operation of the encoding unit E1 will be described.

Initially, the reproduced data Rg1 output from the decoding unit D1 is input to the subtracter 105. In the subtracter 105, a difference between the reproduced data Rg1 and its prediction data Mg2 is obtained as difference data Dg. The difference data Dg is output to the DCT unit 106. In the DCT unit 106, the difference data Dg is transformed to DCT coefficients (frequency components) Tg by DCT (Discrete Cosine Transform), and the DCT coefficients are output to the quantization unit 107.

In the quantization unit 107, the DCT coefficients Tg from the DCT unit 106 are quantized on the basis of the quantization control signal Cq from the rate control unit 113. To be specific, in the quantization step derivation unit 200 of the quantization unit 107, a quantization step different from the quantization step in the inverse quantization process in the decoding unit is derived on the basis of the quantization control signal Cq. In the quantizer 201, the DCT coefficients Tg are quantized on the basis of the derived quantization step.

The quantized values Qg obtained by this quantization are output to the VLC unit 112 and to the inverse quantization unit 108. In the VLC unit 112, the quantized values Qg are transformed to variable-length codes by variable-length coding, and the variable-length codes are output as transcoded data Eg2. In the rate control unit 113, the quantization control signal Cq is generated on the basis of the output Eg2 from the VLC unit 112 to be output to the quantization unit 107.

On the other hand, in the inverse quantization unit 108, the quantized values Qg from the quantization unit 107 are subjected to inverse quantization to generate DCT coefficients IQg2, and the DCT coefficients IQg2 are output to the IDCT unit 109. In the IDCT unit 109, the DCT coefficients IQg2 are transformed to space-domain data ITg2 by IDCT (Inverse Discrete Cosine Transform), and the data ITg2 is output to the adder 110. In the adder 110, addition of the output data ITg2 from the IDCT unit 109 and the prediction data Mg2 is performed, thereby generating reproduced data Rg2. The reproduced data Rg2 is stored in the frame memory 111 as the prediction data Mg2.

In the transcoding system 100a shown in FIG. 20, both of the input coded data (bit stream) and the coded data output from this system are based on the same coding method (MPEG2 coding). However, the transcoding system 100a may transform coded data based on the H261 standard, the H263 standard, the MPEG1 standard or the MPEG2 standard, into coded data based on the MPEG4 standard. Alternatively, the transcoding system 100a may transform coded data based on the MPEG4 standard into coded data based on the H263 standard.

In the above-described transcoding systems, however, it is difficult to reduce a quantization error included in the transcoded stream.

To be specific, since the coded data Eg1 supplied to the transcoding system 100a has been obtained by subjecting image data to a coding process including a quantization process, the coded data Eg1 contains a quantization error. Therefore, the transcoded data Eg2 which has been obtained by subjecting the coded data Eg1 to a decoding process and a transcoding process also contains the quantization error of the coded data Eg1. Even more problematic, depending on the condition of quantization in the transcoding process, the quantization error included in the transcoded data Eg2 becomes significantly larger than the quantization error included in the coded data Eg1.

Moreover, in the transcoding system 100a, it is difficult to set the quantization step in the transcoding process so as to minimize the coding error. Hereinafter, this problem will be described in more detail.

FIG. 22 is a diagram for explaining the relationship between the bit rate of a coded stream and a coding error, included in the coded stream. In FIG. 22, the relationship between them based on the rate-error theory is indicated by a graph C on a two-dimensional coordinate plane, wherein the abscissa corresponds to the bit rate and the ordinate corresponds to the coding error.

Generally, the relationship based on the rate-error theory is realized between the bit rate and the coding error, and the lower limit of the coding error is determined according to the bit rate. In other words, the coding error can be reduced to a smaller value when the bit rate is high, but the coding-error cannot be reduced so much when the bit rate is low.

Therefore, in the direct coding process, i.e., in the process of coding an image signal which has not been coded yet, an optimum quantization step is decided as follows.

Initially, a relational expression (exponential function) indicating the relationship between the bit rate and the coding error, corresponding to an image to be coded, is obtained on the basis of two pairs of bit rate and coding error which are obtained by subjecting an image signal to a coding process including a quantization process using two quantization steps. The lower limit of the coding error corresponding to the bit rate of the coded stream is obtained from this relational expression.

Next, based on this relational expression, a quantization step is determined for each frame so that the coding error of each frame is minimized, within a range where the total number of bits in each frame does not exceed the target number of bits per frame. That is, a quantization step is determined so that the actual coding error is closest to the lower limit of the coding error corresponding to the allowable maximum bit rate.

However, since this method of deriving an optimum quantization step is based on the relational expression (exponential function) indicating the relationship between the bit rate and the coding error, it cannot be used in the transcoding process which cannot derive this relational expression.

That is, in the stream obtained by the transcoding process, the coding error is the sum of the coding error included in the input stream and the coding error which occurs during the transcoding process. In this case, since the coding error included in the input stream is unknown, it is impossible to obtain a relational expression (exponential function) indicating the relationship between the bit rate and the coding error.

Further, in the quantization step derivation method, since a quantization step is determined frame by frame, the coding error cannot be efficiently reduced.

Moreover, in the quantization step derivation method, a quantization step is determined so as to minimize the coding error of the target frame to be coded, and this method is not adapted to inter-frame predictive coding based on MPEG. Hereinafter, this problem will be described briefly.

FIG. 23 is a schematic diagram for explaining inter-frame predictive coding based on MPEG. FIG. 24 illustrates typical image data of video to be subjected to MPEG coding, including an I frame F(1), P frames F(3) and F(5), and B frames F(2) and F(4).

As for the I frame F(1), image data of this frame is subjected to intra-frame coding without referring to image data of another frame. As for each of the P frames F(3) and F(5), image data of this frame is subjected to inter-frame predictive coding with reference to image data of an already-coded frame which is previous to this P frame in display order. As for each of the B frames F(2) and F(4), image data of this frame is subjected to inter-frame predictive coding with reference to image data of two already-coded frames which are previous and subsequent to this frame in display order. Further display times T1~T5 (T1<T2<T3<T4<T5) are set for these frames F(1)~F(5), respectively.

In this case, the coding process for the P frame F(3) is performed with reference to the image data corresponding to the I frame (1), and the image data-of this P frame F(3) is referred to when coding the P frame F(5) and the B frames F(2) and F(4). Accordingly, a coding error which occurs in the coding process for the P frame F(3) increases the predictive residuals in the inter-frame predictive coding for the frames F(2), F(4), and F(5).

In other words, in the inter-frame prediction coding, only setting a quantization step for the frame F(3) so as to minimize the coding error of the frame F(3) is not sufficient for effectively minimizing the coding errors in the frame F(2), F(4), and F(5) which are coded with reference to the image data of the frame F(3).

SUMMARY OF THE INVENTION

The present invention is made to solve the above-described problems and it is an object of the present invention to provide a coded data transform method and a transcoding system which can perform a transcoding process for coded image data while effectively minimizing the quantization error included in the coded data, and a data storage medium which contains a program for making a computer perform a process according to the coded data transformation method.

It is another object of the present invention to provide a transcoding method and a transcoding system which can minimize the coding error on the basis of the relationship between the bit rate and the coding error according to the rate-error theory, and a data storage medium which contains a program for making a computer perform a process according to this transcoding method.

It is still another object of the present invention to provide a transcoding method and a transcoding system which can perform a transcoding process for a reference frame which is referred to in an inter-frame predictive coding process so that the transcoding error of a frame to be subjected to the inter-frame predictive coding is effectively minimized, and a data storage medium which contains a program for making a computer perform a process according to this transcoding method.

Other objects and advantages of the present invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a coded data transform method including a decoding process for decoding first coded data which has been obtained by subjecting image data to a coding process including a first orthogonal transform process and a first quantization process, for each coding unit, to generate decoded data; and a transcoding process for coding the decoded data, for each coding unit, to generate second coded data. The decoding process includes an inverse quantization process for inversely quantizing quantized coefficients obtained from the first coded data, by using a first quantization step which has been used in the first quantization process. The transcoding process includes a second orthogonal transform process for subjecting the decoded data to orthogonal transform to generate frequency-domain data; and a second quantization process for deriving a second quantization step on the basis of the second coded data and the first quantization step, and quantizing the frequency-domain data with the second quantization step. Therefore, a quantization step to be used in the second quantization process can be set according to the quantization step used in the first quantization process. That is, under the restriction on the target number of bits in the transcoding process based on the transcoded data, the quantization step of the second quantization process can be set so that the quantization error is minimized, considering the non-linear relationship between the bit rate in the transcoding process and the quantization distortion (quantization error). Thereby, an increase in the quantization error due to the transcoding process can be effectively suppressed under the restriction on the bit rate.

According to a second aspect of the present invention, in the coded data transform method of the first aspect, the second quantization process further includes a candidate derivation process for deriving a candidate quantization step on the basis of the second coded data; and a quantization step derivation process for deriving the second quantization step on the basis of the candidate quantization step and the first quantization step. Therefore, the number of bits generated in the transcoding process can be made smaller than the target number of bits while suppressing an increase in the quantization error, by a relatively simple process of selecting, as a quantization step to be used in the second quantization process, a larger one between the candidate quantization step and the quantization step used in the first quantization process.

According to a third aspect of the present invention, in the coded data transform method of the second aspect, in the quantization step derivation process, when the candidate quantization step has a value which is equal to or larger than the value of the first quantization step and smaller than twice the value of the first quantization step, a quantization step having the same value as that of the first quantization step or a quantization step having a value equal to or larger than twice the value of the first quantization step is derived as the second quantization step; and when the candidate quantization step has a value outside the above-described range, the candidate quantization step is derived as the second quantization step. Therefore, as the quantization step to be used in the second quantization process, a value outside a range from the value of the quantization step used in the first quantization process to twice the value of this quantization step can be set. Thereby, the number of bits generated in the transcoding process can be made smaller than the target number of bits, without increasing the number of bits of the coded data, and without significantly increasing the quantization error.

According to a fourth aspect of the present invention, in the coded data transform method of the first aspect, the coding process includes a first intra-frame coding process utilizing the correlation of pixel values in a frame, and a first inter-frame coding process utilizing the correlation of pixel values between frames, and the first intra-frame coding process includes a first intra-frame quantization process while the first inter-frame coding process includes a first inter-frame quantization process. The transcoding process includes a second intra-frame coding process utilizing the correlation of pixel values in a frame, and a second inter-frame coding process utilizing the correlation of pixel values between frames, and the second intra-frame coding process includes a second intra-frame quantization process while the second inter-frame coding process includes a second inter-frame quantization process. The decoding process includes an intra-frame decoding process adapted to the intra-frame coding process, and an inter-frame decoding process adapted to the inter-frame coding process, and the intra-frame decoding process includes an intra-frame inverse quantization process while the inter-frame decoding process includes an inter-frame inverse quantization process. The second quantization process includes an average quantization step derivation process for deriving the average of quantization steps of all coding units in the first intra-frame quantization process as a first intra-frame average quantization step, the average of quantization steps of all coding units in the second intra-frame quantization process as a second intra-frame average quantization step, the average of quantization steps of all coding units in the first inter-frame quantization process as a first inter-frame quantization step, and the average of quantization steps of all coding units in the second inter-frame quantization process as a second inter-frame quantization step; and a quantization step derivation process for deriving the second quantization step on the basis of these average quantization steps and the transcoded data. Therefore, in the transcoding process including the intra-frame coding process and the inter-frame coding process, the ratio of re-quantization to intra-frame coding, i.e., the ratio of the second quantization step to the first quantization step, can be made smaller than the ratio of re-quantization to inter-frame coding, whereby the sizes of quantization errors can be made uniform between the intra-frame coding process and the inter-frame coding process.

According to a fifth aspect of the present invention, in the data transform method of the fourth aspect, in the second quantization step derivation process, the second quantization step is derived so that the ratio of the second intra-frame average quantization step to the first intra-frame average quantization step is smaller than the ratio of the second inter-frame average quantization step to the first inter-frame average quantization step. Therefore, a quantization step to be used in the transcoding process can be derived so that the ratio of re-quantization to intra-frame coding (i.e., the ratio of the quantization step of the second coding process to the quantization step of the first coding process) becomes smaller than the ratio of re-quantization to inter-frame coding. Thereby, the sizes of quantization errors due to the respective coding processes can be made uniform between the intra-frame coding process and the inter-frame coding process in the transcoding process.

According to a sixth aspect of the present invention, there is provided a transcoding system comprising a decoding unit for receiving coded data which has been obtained by subjecting image data of each coding unit to a coding process including a first orthogonal transform process and a first quantization process, and decoding the input coded data for each coding unit to generate decoded data; and an encoding unit for coding the decoded data to generate transcoded data.

The decoding unit includes an inverse quantizer for inversely quantizing quantized coefficients obtained from the input coded data, with a first quantization step which has been used in the first quantization process. The encoding unit includes a frequency transform unit for subjecting the decoded data to a second orthogonal transform process to generate frequency-domain data; and quantization means for subjecting the frequency-domain data to a second quantization process with a second quantization step which is derived on the basis of the transcoded data and the first quantization step. Therefore, a quantization step to be used in the second quantization process can be set so that the quantization error is minimized, on the basis of the non-linear relationship between the bit rate in the transcoding process and the quantization distortion (quantization error), while suppressing the number of bits in the transcoding process under the target number of bits. Thereby, an increase in the quantization error due to the transcoding process can be effectively suppressed under the restriction on the bit rate.

According to a seventh aspect of the present invention, in the transcoding system of the sixth aspect, the inverse quantizer performs inverse quantization corresponding to either intra-frame quantization or inter-frame quantization, according to that the coding process performed on the input coded data is either intra-frame coding or inter-frame coding. The quantization means comprises a first step derivation unit for averaging the quantization steps of all coding units in the inverse quantization process corresponding to the intra-frame quantization process, on the basis of the first quantization step supplied from the inverse quantizer, thereby deriving an intra-frame average quantization step; a second step derivation unit for averaging the quantization steps of all coding units in the inverse quantization process corresponding to the inter-frame quantization, on the basis of the first quantization step supplied from the inverse quantizer, thereby deriving an inter-frame average quantization step; and a quantization step derivation unit for deriving a second quantization step on the basis of the transcoded data, the intra-frame average quantization step, and the inter-frame average quantization step. The quantization means quantizes the frequency-domain data with the second quantization step. Therefore, in the transcoding process including the intra-frame coding process and the inter-frame coding process, the ratio of re-quantization to intra-frame coding, i.e., the ratio of the second quantization step to the first quantization step, can be made smaller than the ratio of re-quantization to inter-frame coding, whereby the sizes of quantization errors can be made uniform between the intra-frame coding process and the inter-frame coding process.

According to an eighth aspect of the present invention, there is provided a data storage medium containing a data transform program for making a computer perform the coded data transform method of the first aspect. Therefore, the transcoding process can be performed with effectively suppressing an increase in the quantization error.

According to a ninth aspect of the present invention, there is provided a transcoding method for transforming an input stream obtained by coding an image signal, into a transcoded stream having a bit rate lower than a specified bit rate, in a transcoding process. This method comprises a decoding process for decoding the input stream to generate a decoded stream; a plurality of simulation coding processes having different quantization steps, for successively quantizing and coding the decoded stream for every coding unit; a quantization step derivation process for deriving an optimum quantization step so that a difference between the bit rate of the transcoded stream and the specified bit rate is minimized, on the basis of the numbers of bits per coding unit which are obtained in the respective simulation coding processes, the increments of coding error due to the respective simulation coding processes, and the specified bit rate; and a main coding process for quantizing and coding the decoded stream with the optimum quantization step, and outputting a transcoded stream corresponding to the input stream Therefore, even in the transcoding process where a coding error included in the input stream is unknown, the coding error can be minimized. Further, the bit rate of the transcoded stream can be suppressed under a predetermined value. As the result, a transcoded stream having high transmission efficiency can be obtained without degrading the image quality.

According to a tenth aspect of the present invention, the transcoding method of the ninth aspect includes, as the plural simulation coding processes, a first simulation coding process for coding the decoded stream with a first quantization step, and a second simulation coding process for coding the decoded stream with a second quantization step which is larger than the first quantization step. Therefore, an optimum quantization step for the transcoding process can be derived by the relatively simple structure.

According to an eleventh aspect of the present invention, in the transcoding method of the tenth aspect, in the quantization step derivation process, a transcoding error increasing rate which is the ratio of a variation in increment of coding error to a variation in the number of bits per coding unit in the transcoding process, is calculated on the basis of the number of bits per coding unit which is obtained in the first simulation coding process, the increment of coding error due to the first simulation coding process, the number of bits per coding unit which is obtained in the second simulation coding process, and the increment of coding error due to the second simulation coding process; and either the first quantization step or the second quantization step is derived as an optimum quantization step, for each coding unit, according to the transcoding error increasing rate. Therefore, even in the transcoding process where a coding error included in the input stream is unknown, the coding error can be minimized according to the rate-error theory.

According to a twelfth aspect of the present invention, there is provided a transcoding method for subjecting an input stream obtained by coding an image signal to a transcoding process for each coding unit, thereby transforming the input stream into a transcoded stream having a bit rate lower than a specified bit rate. This method comprises a calculation process for calculating a target transcoding error increasing rate corresponding to one frame, on the basis of data obtained as the result of the transcoding process, the target transcoding error increasing rate being the ratio of an increment of coding error per coding unit which is generated in the transcoding process to the number of bits per coding unit which is reduced by the transcoding process; a decoding process for decoding the input stream to generate a decoded stream; a plurality of simulation coding processes having different quantization steps, for successively quantizing and coding the decoded stream for every coding unit; a quantization step optimization process for deriving an optimum quantization step for each coding unit, on the basis of the numbers of bits per coding unit which are obtained in the respective simulation coding processes, the increments of coding error due to the respective simulation coding processes, and the target transcoding error increasing rate; and a main coding process for quantizing and coding the decoded stream with the optimum quantization step, and outputting a transcoded stream corresponding to the input stream. Therefore, even in a transcoding process where a coding error included in the input stream is unknown, the coding error can be minimized and, furthermore, the quality of image obtained from the transcoded stream is prevented from being degraded. As a result, the coded stream can be transformed to a stream of high transmission efficiency, without degrading the image quality.

According to a thirteenth aspect of the present invention, the transcoding method of the twelfth aspect includes, as the plural simulation coding processes, a first simulation coding process for quantizing and coding the decoded stream with a first quantization step; a second simulation coding process for quantizing and coding the decoded stream with a second quantization step which is larger than the first quantization step; and a third simulation coding process for quantizing and coding the decoded stream with a third quantization step which is larger than the second quantization step. Therefore, an optimum quantization step for the transcoding process can be derived by the relatively simple structure.

According to a fourteenth aspect of the present invention, in the transcoding method of the thirteenth aspect, the quantization step derivation process includes a function derivation process for deriving, for each coding unit, a function which indicates the relationship between the quantization step corresponding to each coding unit and the transcoding error increasing rate which is the ratio of a variation in increment of coding error to a variation in the number of bits per coding unit in the transcoding process, on the basis of the first, second, and third numbers of bits per coding unit which are generated in the first, second, and third simulation coding processes, first, second, and third increments of coding error due to the first, second, and third simulation coding processes, and first, second, and third quantization steps used in the first, second, and third simulation coding processes; and a quantization step decision process for deciding a quantization step in which the transcoding error increasing rate corresponding to each coding unit matches the target transcoding error increasing rate corresponding to the one frame, as an optimum quantization step for each coding unit, on the basis of the function. Therefore, an optimum quantization step can be derived with high precision.

According to a fifteenth aspect of the present invention, in the transcoding method of the fourteenth aspect, in the quantization step derivation process, only when the transcoding error increasing rate corresponding to each coding frame is smaller than the target transcoding error increasing rate corresponding to one frame, the quantization step used in the first simulation coding process is derived as an optimum quantization step, instead of the optimum quantization step decided in the quantization step decision process. Therefore, even when it is difficult to derive an optimum quantization step on the basis of the function, the operation to derive the quantization step is performed with stability.

According to a sixteenth aspect of the present invention, in the transcoding method of the fifteenth aspect, in the quantization step derivation process, when the transcoding error increasing rate corresponding to each coding unit is not smaller than the target transcoding error increasing rate corresponding to one frame, a value larger than the second quantization step is derived as the value of the optimum quantization step to be obtained in the quantization step decision process. Therefore, when an optimum quantization step can be derived on the basis of the function, it is derived with high precision.

According to a seventeenth aspect of the present invention, there is provided a transcoding system for transforming an input stream obtained by coding an image signal, into a transcoded stream having a bit rate lower than a specific bit rate, in a transcoding process. This system comprises a calculator for calculating the target number of bits for a target frame to be transcoded, on the basis of data obtained as the result of the transcoding process and a specified bit rate supplied from the outside of the system; a decoder for decoding the input stream to generate a decoded stream; a plurality of simulation encoders having different quantization steps, each encoder performing simulation coding for successively quantizing and coding the decoded stream for every coding unit; a quantization step derivation unit for deriving an optimum quantization step so that a difference between the bit rate of the transcoded stream and the specified bit rate is minimized, on the basis of the numbers of bits per coding unit which are obtained in the processes of the respective simulation encoders, the increments of coding error due to the processes of the respective simulation encoders, and the target number of bits for the target frame; and a main encoder for quantizing and coding the decoded stream with the optimum quantization step, and outputting a transcoded stream corresponding to the input stream. Therefore, even in the transcoding process where a coding error included in the input stream is unknown, the coding error can be minimized and, moreover, the bit rate of the transcoded stream can be suppressed under a predetermined value. As a result, a transcoded stream having high transmission efficiency is obtained without degrading the image quality.

According to an eighteenth aspect of the present invention, the transcoding system of the seventeenth aspect includes, as the plural simulation encoders, a first simulation encoder for subjecting the decoded stream to a first simulation coding process including a quantization process using a first quantization step, and outputting the number of bits per coding unit obtained by the simulation coding process, an increment of coding error due to the simulation coding process, and the first quantization step; and a second simulation encoder for subjecting the decoded stream to a second simulation coding process including a quantization process using a second quantization step which is larger than the first quantization step, and outputting the number of bits per coding unit obtained in the simulation coding process, an increment of coding error due to the simulation coding process, and the second quantization step; and a switch for selecting either the first quantization step or the second quantization step. In this transcoding system, the quantization step derivation unit calculates a transcoding error increasing rate which is the ratio of a variation in increment of coding error to a variation in the number of bits per coding unit in the transcoding process, on the basis of the numbers of bits per coding unit which are obtained in the first and second simulation coding processes and the increments of coding error due to the first and second simulation coding processes, and the quantization step derivation unit controls the switch so that it selects either the first quantization step or the second quantization step, according to the transcoding error increasing rate corresponding to each coding unit. Therefore, even in the transcoding process where a coding error included in the input stream is unknown, the coding error can be minimized on the basis of the rate-error theory.

According to a nineteenth aspect of the present invention, there is provided a transcoding system for subjecting an input stream obtained by coding an image signal to a transcoding process for each coding unit, thereby transforming the input stream into a transcoded stream having a bit rate lower than a specific bit rate. This system comprises a calculator for calculating a target transcoding error increasing rate corresponding to one frame, on the basis of data obtained as the result of the transcoding process, the target transcoding error increasing rate being the ratio of an increment of coding error per coding unit which is generated in the transcoding process to the number of bits per coding unit which is reduced by the transcoding process; a decoder for decoding the input stream to generate a decoded stream; a plurality of simulation encoders having different quantization steps, each encoder performing simulation coding for successively quantizing and coding the decoded stream for each coding unit; a quantization step derivation unit for deriving an optimum quantization step for each coding unit, on the basis of the numbers of bits per coding unit which are obtained in the processes of the respective simulation encoders, the increments of coding error due to the processes of the respective simulation encoders, and the target number of bits for the target frame; and a main encoder for quantizing and coding the decoded stream with the optimum quantization step, and outputting a transcoded stream corresponding to the input stream. Therefore, even in the transcoding process where a coding error included in the input stream is unknown, the coding error can be minimized and, furthermore, the quality of image obtained from the transcoded stream is prevented from being degraded. As the result, the coded stream can be transformed to a stream of high transmission efficiency, without degrading the image quality.

According to a twentieth aspect of the present invention, the transcoding system if the nineteenth aspect includes, as the plural simulation encoders, a first simulation encoder for subjecting the decoded stream to a first simulation coding process including a quantization process using a first quantization step, and outputting the number of bits per coding unit obtained in the simulation coding process, an increment of coding error due to the simulation coding process, and a first quantization step; a second simulation encoder for subjecting the decoded stream to a second simulation coding process including a quantization process using a second quantization step which is larger than the first quantization step, and outputting the number of bits per coding unit obtained in the simulation coding process, an increment of coding error due to the simulation coding process, and the second quantization step; and a third simulation encoder for subjecting the decoded stream to a third simulation coding process including a quantization process using a third quantization step which is larger than the second quantization step, and outputting the number of bits per coding unit obtained in the simulation coding process, an increment of coding error due to the simulation coding process, and the third quantization step. Therefore, an optimum quantization step for the transcoding process can be derived by the relatively simple structure.

According to a twenty-first aspect of the present invention, in the transcoding system of the twentieth aspect, the quantization step derivation unit comprises a calculation unit for calculating a transcoding error increasing rate which is the ratio of a variation in increment of coding error to a variation in the number of bits per coding unit in the transcoding process, on the basis of the numbers of bits per coding unit which are obtained in the processes of the respective simulation encoders, and the increments of coding error due to the processes of the respective simulation encoders; and a quantization step selector for selecting one of the first, second, and third quantization steps, according to the result of comparison between the transcoding error increasing rate corresponding to each coding unit and the target transcoding error increasing rate. Therefore, an optimum quantization step for the transcoding process can be derived with high precision, by the relatively simple structure.

According to a twenty-second aspect of the present invention, in the transcoding system of the twentieth aspect, the quantization step derivation unit includes a function derivation unit for deriving, for each coding unit, a function which indicates the relationship between the quantization step corresponding to each coding unit and the transcoding error increasing rate which is the ratio of a variation in increment of coding error to a variation in the number of bits per coding unit in the transcoding process, on the basis of the first, second, and third numbers of bits per coding unit which are generated by the first, second, and third simulation coding processes, first, second, and third increments of coding error due to the first, second, and third simulation coding processes, and the first, second, and third quantization steps used in the first, second, and third simulation coding processes; and a quantization step calculator for calculating a quantization step in which the transcoding error increasing rate corresponding to each coding unit matches the target transcoding error increasing rate corresponding to one frame, as an optimum quantization step for each coding unit, on the basis of the function. Therefore, an optimum quantization step for the transcoding process can be derived with high precision, by the relatively simple structure.

According to a twenty-third aspect of the present invention, in the transcending system of the twenty-second aspect, the quantization step derivation unit includes a comparator for comparing the transcoding error increasing rate corresponding to each coding unit, with the target transcoding error increasing rate; and a quantization step selector for selecting either the quantization step calculated by the quantization step calculator or the first quantization step, according to the result of comparison, and outputting the selected quantization step as an optimum quantization step. Therefore, even when it is difficult to derive an optimum quantization step on the basis of the function, the operation to derive the quantization step can be performed with stability. On the other hand, when an optimum quantization step can be derived on the basis of the function, it is derived with high precision.

According to a twenty-fourth aspect of the present invention, there is provided a data storage medium containing a program for making a computer perform the transcoding method of the ninth aspect. Therefore, the process of transforming the coded stream to a stream of high transmission efficiency without degrading the image quality can be realized by software.

According to a twenty-fifth aspect of the present invention, there is provided a data storage medium containing a program for making a computer perform the transcoding method of the twelfth aspect. Therefore, the process of transforming the coded stream to a stream of high transmission efficiency without degrading the image quality can be realized by software.

DETAILED DESCRIPTION OF THE PREFERRED EMBODIMENTS

First of all, the inventor's viewpoint and the fundamental principle of the present invention will be described.

As already described in the section of BACKGROUND OF THE INVENTION, coded data input to a transcoding system has been obtained by subjecting image data to a coding process including a quantization process (first quantization process) and, therefore, this coded data includes a quantization error.

Further, in the transcoding system, decoded data is generated by subjecting the coded data to a decoding process including an inverse quantization process and, further, this decoded data is subjected to a coding process including a quantization process (second quantization process), thereby generating transcoded data.

The inventors of the present invention have earnestly studied the problem that the transcoded data so obtained may have a quantization error which is considerably larger than the quantization error included in the coded data, depending on the condition of quantization in the transcoding process, and finally discovered that the size of the quantization error, which is caused by the second quantization process and included in the transcoded data, significantly varies according to the relationship in relative sizes between a quantization step in the first quantization process and a quantization step in the second quantization process.

Hereinafter, the inventors' discovery will be briefly described by using FIG. 7.

Figure 7:
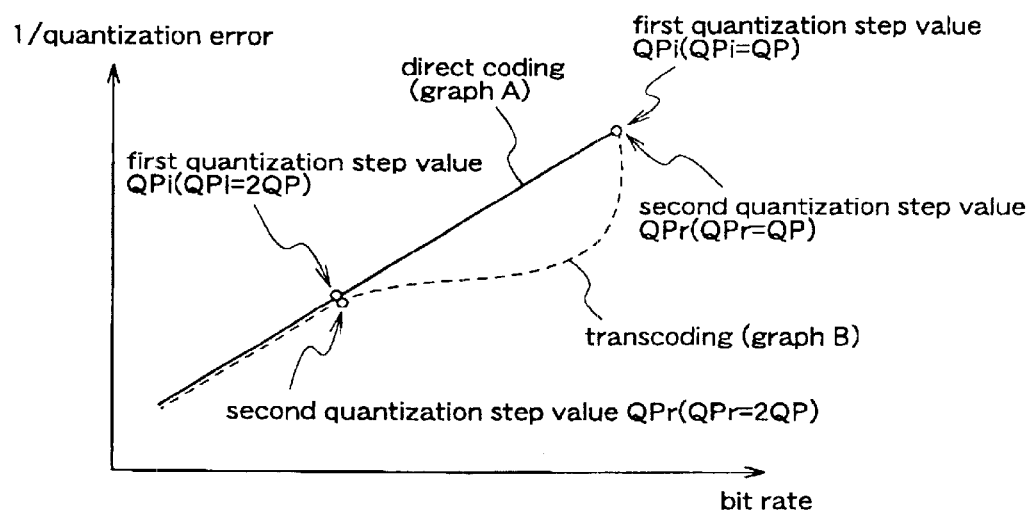
FIG. 7 is a diagram illustrating the relationship between bit rate and quantization distortion (quantization error in a transcoding process).

FIG. 7 is a diagram illustrating the relationship between the bit rate of the transcoded and the quantization distortion included in the transcoded data, by using graph A and B on a two-dimensional coordinate plane. In FIG. 7, the abscissa corresponds to the bit rate, and the ordinate corresponds to the inverse of quantization error as the quantization distortion. The graph A (full line) shows the relationship between the bit rate and the quantization distortion corresponding to coded data obtained by subjecting image data to only one coding process including a quantization process (hereinafter referred to also as direct-coded data). The graph B (dotted line) shows the relationship between the bit rate and the quantization distortion corresponding to transcoded data obtained by subjecting the direct-coded data to a transcoding process (hereinafter referred to also as direct-coded data). The graph B (dotted line) shows the relationship between the bit rate and the quantization distortion, corresponding to transcoded data obtained by subjecting the direct-coded data to a transcoding process.

As seen from the graph A, in the coding process including only one quantization process for the image data (direct coding process), the function between the bit rate and the inverse of the quantization distortion (quantization error) with the quantization step in the coding process as a parameter is almost linear. On the other hand, in the transcoding process for the direct-coded data, as seen from the graph B, the function between the bit rate and the inverse of the quantization distortion (quantization error) with the quantization step in the transcoding process as a parameter is not linear.

For example, in the case where the quantization process in the direct coding process is performed with a quantization step value (first quantization step value) QPi (QPi=QP), when a quantization step value (second quantization step value) QPr in the transcoding process is set within a predetermined range (QP<QPr<2QP), the quantization error increases significantly as compared with the case where the quantization step value (first quantization step value) QPi in the direct coding process is set within the predetermined range (QP≦QPi≦2QP).

To be specific, the following fact has been discovered by experience. The quantization error in the transcoded data is large when the bit rate is high, i.e., when a difference between the quantization step value QPi in the first quantization process arid the quantization step value QPr in the second quantization process is small. On the other hand, when the quantization step value QPr in the second quantization process is equal to or larger than 2QP (QPi=QP) and the bit rate of the transcoded data is low, there is scarcely a difference between the quantization error in the direct coding process and the quantization error in the transcoding process.

Furthermore, when the second quantization process is performed with a quantization step that is smaller than the quantization step in the first quantization process, in the transcoded data, the quantization error caused by the first quantization process is larger than and more dominant than the quantization error caused by the second quantization process. Accordingly, even when the second quantization process is performed with a quantization step which is smaller than the quantization step in the first quantization process, only the bit rate of the transcoded data increases with no reduction in the quantization error and, therefore, this is meaningless.

As a result, the inventors of the present invention have focused their attention to the above-described relationship between the quantization step and the quantization error in the transcoding process, and devised the following method as a countermeasure against the problem that the quantization error of the transcoded data obtained by the transcoding process becomes considerably larger than the quantization error of the coded data obtained by the direct coding process. That is, in the transcoding process for the coded data obtained by subjecting image data to the direct coding process, the quantization step value (second quantization step value) QPr in the quantization process is set at twice or more of the quantization step value (first quantization step value) QPi in the quantization process included in the direct coding process.

Furthermore, in the MPEG coding method, optimum quantization processes are employed for intra-frame coding and inter-frame coding, respectively, and therefore, the quantization process for intra-frame coding is different from that for inter-frame coding. Further the size of the quantization error generated in the transcoding process has a close relation to the quantization method employed in the transcoding process.

For example, the following fact has also been discovered by experience. That is, in the intra-frame coding process and the inter-frame coding process, quantization processes based on MPEG are performed by using the same quantization step, and the bit streams obtained by these coding processes are subjected to transcoding processes including second quantization processes using a second quantization step which is k times as large as the first quantization step. In this case, the quantization error caused by the intra-frame coding process becomes larger than that caused by the inter-frame coding process.

As a result, the inventors of the present invention have devised a method for deriving a second quantization step so that the ratio of the second quantization step to the first quantization step (re-quantization ratio) in the intra-frame coding process becomes smaller than the re-quantization ratio in the intra-frame coding process.

Furthermore, the inventors of the present invention have earnestly studied the problem that it is difficult to set the quantization step Qrd in the above-described transcoding step so as to minimize the coding error, and finally discovered the following fact. That is, although the relationship between the bit rate and the coding error varies according to the coding method or the target image to be coded, when a variation in the coding error per unit variation in the bit rate (i.e., the inclination of a curved graph C shown in FIG. 23) is made approximately equal with respect to all coding units constituting one frame (e.g., blocks each comprising 8×8 pixels, or macroblocks each comprising 16×16 pixels), the average of coding errors corresponding to all coding units in one frame is minimized.

Accordingly, in a transcoding method and a transcoding system according to the present invention, a variation in the coding error per unit variation in the bit rate is obtained as a transcoding error increasing rate, by subjecting an input coded stream corresponding to each coding unit (block or macroblock) to plural kinds of simulation coding processes having different quantization steps, for quantizing and coding the coded stream so as to reduce the bit rate. Then, a quantization step is decided for each coding unit so that the transcoding error increasing rate corresponding to each coding unit becomes as constant as possible.

Hereinafter, preferred embodiments of the present invention will be described with reference to FIGS. 1 to 19.

Embodiment 1

Figure 1:
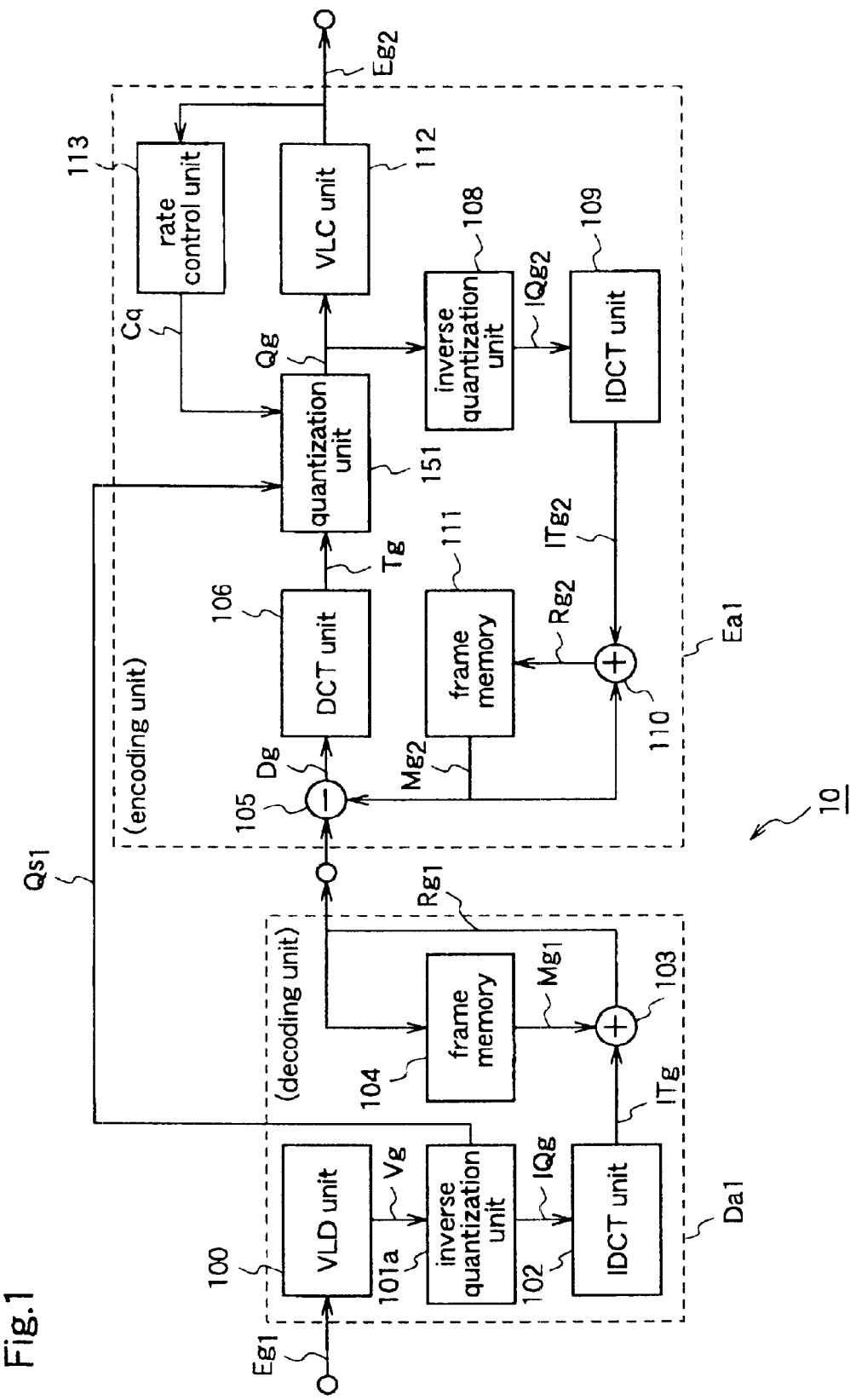
FIG. 1 is a block diagram for explaining a transcoding system according to a first embodiment of the present invention.

FIG. 1 is a block diagram for explaining a transcoding system 10 according to a first embodiment of the present invention.

The transcoding system 10 according to this first embodiment comprises a decoding unit Da1 and an encoding unit Ea1. The decoding unit Da1 receives coded data Eg1 which has been obtained by subjecting image data to a coding process including a quantization process (first quantization process), and subjects the coded data Eg1 to a decoding process including an inverse quantization process, thereby generating decoded data Rg1. The encoding unit Ea1 subjects the decoded data Rg1 to a coding process (transcoding process) including a re-quantization process (second quantization process), thereby generating transcoded data Eg2.

The decoding unit Da1 includes, instead of the inverse quantization unit 101 of the prior art decoding unit D1, an inverse quantization unit 101a which subjects the output Vg from the VLD (variable-length decoding) unit 100 to inverse quantization, and outputs a first quantization step Qs1 to the encoding unit E1. The first quantization step Qs1 used in the inverse quantization process is identical to the quantization step used in the quantization process for the image data (first quantization process). Further, the transcoding unit Ea1 according to this first embodiment includes, instead of the quantization unit 107 of the prior art transcoding unit E1, a quantization unit 151 which subjects the output Tg from the DCT unit 106 to a quantization process based on a quantization control signal Cq supplied from the rate control unit 113 and the first quantization step Qs1 supplied from the inverse quantization unit 101a.

Other constituents of the transcoding system 10 according to this first embodiment are identical to those of the prior art transcoding system 100a.

Figure 2:
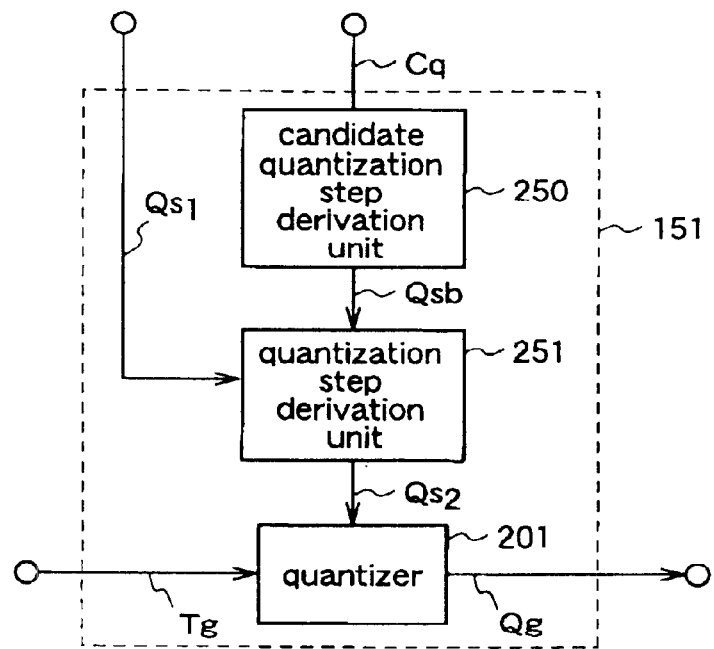
FIG. 2 is a block diagram for explaining a quantization unit which is a constituent of the transcoding system according to the first embodiment.

FIG. 2 is a block diagram illustrating the quantization unit 151 in more detail.

The quantization unit 151 comprises a candidate quantization step derivation unit 250, a quantization step derivation unit: 251, and a quantizer 201. The candidate quantization step derivation unit 250 derives a candidate quantization step Qsb so that the number of bits in a target frame to be coded approaches the target number of bits, on the basis of the quantization control signal Cq from the rate control unit 113. The quantization step derivation unit 251 derives a quantization step (second quantization step) Qs2 in the second quantization process, on the basis of the candidate quantization step Qsb and the first quantization step Qs1. The quantizer 210 quantizes the output Tg from the DCT unit 106 on the basis of the second quantization step Qs2, and outputs quantized coefficients Qg.

Figure 3:
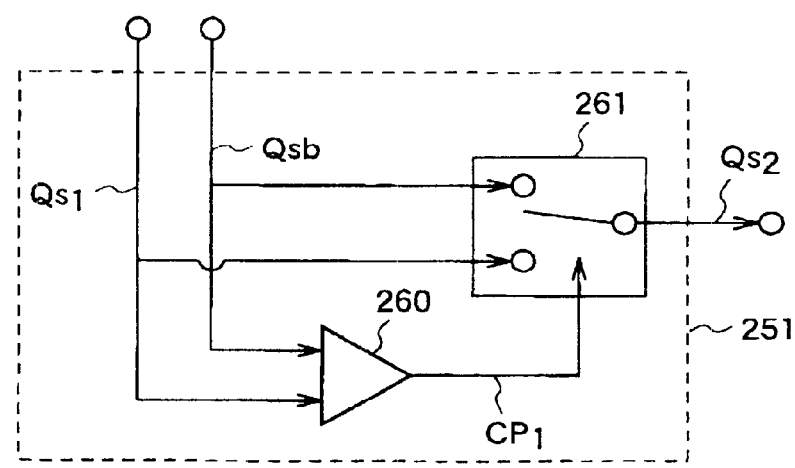
FIG. 3 is a block diagram for explaining a quantization step derivation unit which is a constituent of the quantization unit according to the first embodiment.

FIG. 3 is a block diagram illustrating the quantization step derivation unit 251 in more detail.

The quantization step derivation unit 251 comprises a comparator 260 which compares the candidate quantization step Qsb supplied from the candidate quantization step derivation unit 250 with the first quantization step Qs1 supplied from the inverse quantization unit 101a; and a switch 261 which selects either the candidate quantization step Qsb or the first quantization step Qs1 on the basis of the result of comparison CP1 supplied from the comparator 260. The output from the switch 261 is output as the second quantization step Qs2.

To be specific, the switch 261 is constructed so that it selects the first quantization step Qs1 when the candidate quantization step Qsb is smaller than the first quantization step Qs1, and selects the candidate quantization step Qsb when the candidate quantization step Qsb is equal to or larger than the first quantization step Qs1.

Next, the operation of the transcoding system 10 will be described.

When coded data Eg1, which has been obtained by subjecting image data to a coding process including a quantization process, is input to the transcoding system 10, the decoding unit Da1 subjects the coded data Eg1 to a decoding process including an inverse quantization process, thereby generating decoded data (reproduced data) Rg1. Further, in the inverse quantization process, the first quantization step Qs1 used in the quantization process is output from the inverse quantization unit 101a to the quantization unit 151 of the encoding unit Ea1.

When the reproduced data Rg1 output from the decoding unit Da1 is input to the encoding unit Ea1, a difference between the reproduced data Rg1 and its prediction data Mg2 is obtained in the subtracter 105, and this is output to the DCT unit 106 as difference data Dg in the DCT unit 106, the difference data Dg is transformed to DCT coefficients Tg by DCT (Discrete Cosine Transform), and the DCT coefficients Tg are output to the quantization unit 151.

In the quantization unit 151, the DCT coefficients Tg supplied from the DCT unit 106 are subjected to a quantization process (second quantization process), on the basis of the first quantization step Qs1 supplied from the inverse quantization unit 101a of the decoding unit Da1 and the quantization control signal Cq supplied from the rate control unit 113, and quantized values (quantized coefficients) Qg obtained in this quantization process are output to the VLC unit 112 and to the inverse quantization unit 108.

In the VLC unit 112, the quantized values Qg from the quantization unit 151 are transformed to variable length codes, and the variable-length codes are output as transcoded data Eg2. In the rate control unit 113, a quantization control signal Cq indicating the target number of bits of the target frame is generated on the basis of the output Eg2 from the VLC unit 112, and this signal Cq is output to the quantization unit 151.

On the other hand, in the inverse quantization unit 108, the quantized values Qg from the quantization unit 151 are subjected to inverse quantization, and DCT coefficients IQg2 generated in the inverse quantization process are output to the IDCT unit 109. In the IDCT unit 109, the DCT coefficients IQg2 are transformed to space-domain data ITg2 by IDCT (Inverse Discrete Cosine Transform), and the data ITg2 is input to the adder 110. In the adder 110, the output data ITg2 from the IDCT unit 109 and the prediction data Mg2 are added, and reproduced data Rg2 obtained by this addition is stored as the prediction data. Mg2 in the frame memory 111.

Hereinafter, a description will be given of the operation of the quantization unit 151 by using FIG. 2.

The quantization control signal Cq indicating the target number of bits of the target frame is input to the candidate quantization step derivation unit 250. In the candidate quantization step derivation unit 250, a candidate quantization step Qsb which makes the number of bits of the target frame approach the target number of bits is derived, and this candidate quantization step Qsb is output to the quantization step derivation unit 251.

In the quantization step derivation unit 251, a second quantization step Qs2 is derived on the basis of the candidate quantization step Qsb and the first quantization step Qs1 supplied from the decoding unit Da1. The second quantization step Qs2 is output to the quantizer 201. In the quantizer 201, the output Tg from the DCT unit 106 is subjected to quantization based on the second quantization step Qs2.

At this time, in the quantization step derivation unit 251 shown in FIG. 3, the comparator 260 is supplied with the output Qsb (candidate quantization step) from the candidate quantization step derivation unit 250, and the output Qs1 (first quantization step) from the in verse quantization unit 101a of the decoding unit Da1. In the comparator 260, the candidate quantization step Qsb is compared with the first quantization step Qs1, and the result of comparison CP1 is output to the switch 261. In the switch 261, either the candidate quantization step Qsb or the first quantization step Qs1 is selected on the basis of the result of comparison CP1, and the selected step is output as a second quantization step Qs2.

As described above, according to the transcoding system of the present invention, the inverse quantization unit 101a in the decoding unit Da1 is constructed so that it performs inverse quantization on the output Vg from the VLD unit 100 and outputs the first quantization step Qs1 used in this inverse quantization to the encoding unit Ea1, and the quantization unit 151 in the encoding unit Ea1 is constructed so that it performs quantization with a quantization step larger than the first quantization step Qs1, on the basis of the first quantization step Qs1 and the quantization control signal Cq which indicates the target number of bits of the target frame. Therefore, the transcoding process for the coded data Eg1 can be performed while suppressing an increase in the quantization error, without increasing the number of bits.

Furthermore, in this first embodiment, either the candidate quantization step Qsb obtained according to the quantization control signal Cq (the target number of bits) or the first quantization step is used as the second quantization step Qs2. Therefore, the number of bits per frame of the transcoded data Eg2 varies (increases or decreases) a little from the target number of bits as compared with the case where only the candidate quantization step Qsb is used as the second quantization step. However, this variation is negligible. That is, in this first embodiment, the quantization process in the transcoding process is performed in units of blocks in each frame, each block comprising a predetermined number of pixels, according to a quantization step which is larger than the first quantization step Qs1. Therefore, in the practical use, macro variation (increase or decrease) in the number of bits, which is caused by frame by frame variation in the number of bits, is negligible. Accordingly, to perform the second quantization process with a quantization step larger than the first quantization step Qs1 does not impede the rate control of this first embodiment, i.e., feedback control for controlling the number of bits per frame by using the quantization step based on the transcoded data.

Embodiment 2

Figure 4:
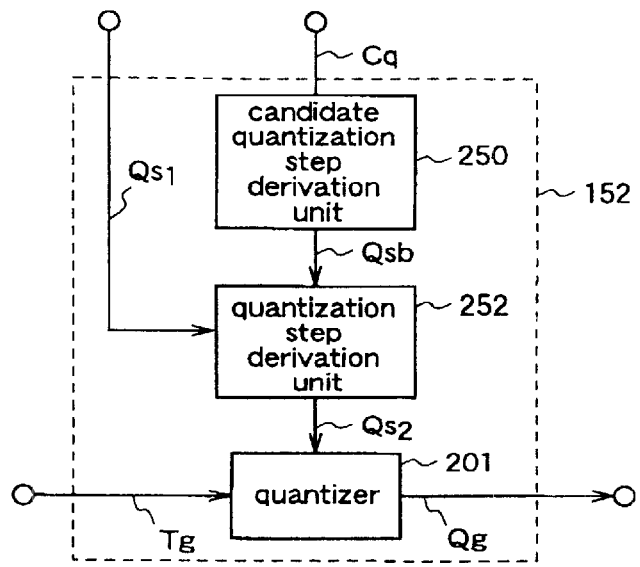
FIG. 4 is a block diagram for explaining a quantization unit which is a constituent of a transcoding system according to a second embodiment of the present invention.

FIG. 4 is a block diagram for explaining a quantization unit 152 as one of constituents of a transcoding system according to a second embodiment of the present invention.

The quantization unit 152 according to this second embodiment includes a quantization step derivation unit 252, instead of the quantization step derivation unit 251 according to the first embodiment. The quantization step derivation unit 252 compares the candidate quantization step Qsb with a threshold Qth which is obtained from the quantization step (first quantization step) Qs1 in the first quantization process, and with a constant multiple Qmu obtained by multiplying the first quantization step Qs1 with a constant, and derives a second quantization step Qs2 in accordance with the result of comparison. The threshold Qth is m times as large as the first quantization step Qs1, and the constant multiple Qmu is n times (n>m) as large as the first quantization step Qs1. Specifically, m is 1.5 and n is 2.

Other constituents of the transcoding system according to this second embodiment are identical to those of the transcoding system 10 according to the first embodiment.

Figure 5:
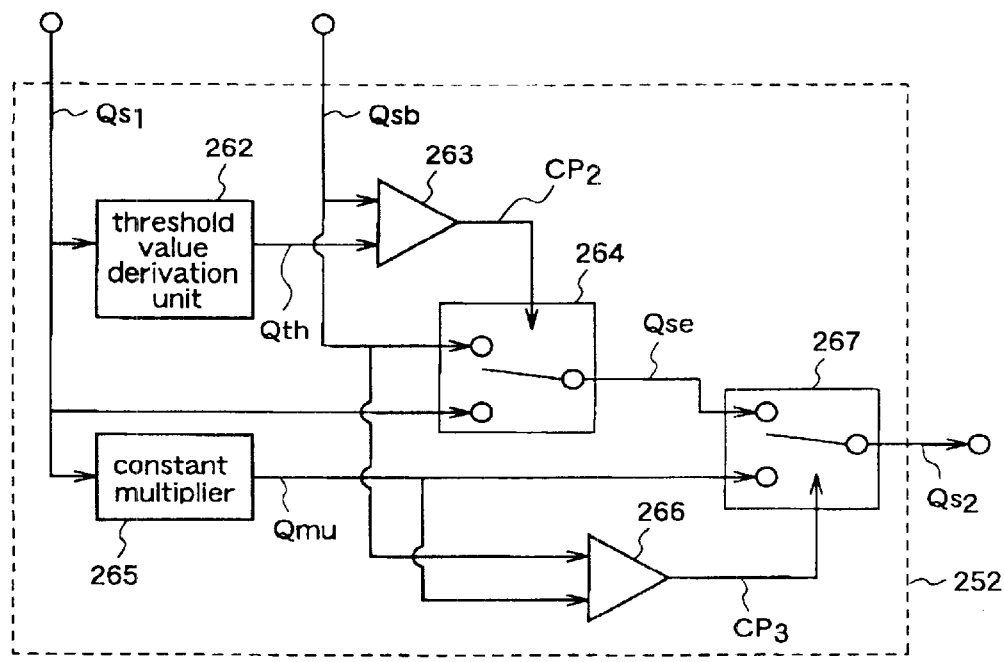
FIG. 5 is a block diagram for explaining a quantization step derivation unit 252 which is a constituent of the quantization unit according to the second embodiment.

FIG. 5 is a block diagram illustrating the quantization step derivation unit 252 in more detail.

The quantization step derivation unit 252 includes a threshold derivation unit 262 which derives a threshold Qth (=m×Qs1) on the basis of the first quantization step Qs1; a comparator 263 which compares the threshold Qth with the candidate quantization step Qsb generated in the candidate quantization step derivation unit 250, and outputs a comparison output CP2 indicating the result of the comparison; and a switch 264 which selects either the first quantization step Qs1 or the candidate quantization step Qsb according to the output CP2 from the comparator 263, and outputs it as a selected quantization step Qse. When the result of comparison indicates that candidate quantization step Qsb is smaller than the threshold Qth, the switch 264 selects the first quantization step Qs1 to be output as a selected quantization step Qse. When the candidate quantization step Qsb is equal to or larger than the threshold Qth, the candidate quantization step Qsb is output as a selected quantization step Qse.

Further, the quantization step derivation unit 252 includes a constant multiplier 265 which multiplies the first quantization step Qs1 by a constant n and outputs a constant multiple Qmu (=n×Qs1); a comparator 266 which compares the constant multiple Qmu with the candidate quantization step Qsb supplied from the candidate quantization step derivation unit 250, and outputs a comparison output CP3 which indicates the result of comparison; and a switch 267 which selects either the selected quantization step Qse from the switch 264 or the constant multiple Qmu from the constant multiplier 265 on the basis of the output CP3 from the comparator 266, and outputs it as a second quantization step Qs2. When the result CP3 from the comparator 266 indicates that the candidate quantization step Qsb is smaller than the constant multiple Qmu, the switch 267 outputs the constant multiple Qmu as a second quantization step Qs2. When the candidate quantization step Qsb is equal to or larger than the constant multiple Qmu, the switch 267 outputs the quantization step Qse from the switch 264 as a second quantization step Qs2.

The constant n used by the constant multiplier 265 is larger than the constant m used by the threshold derivation unit 262, and the m is variable according to the target bit rate, the frame rate, the quantization method, etc.

Figure 6:
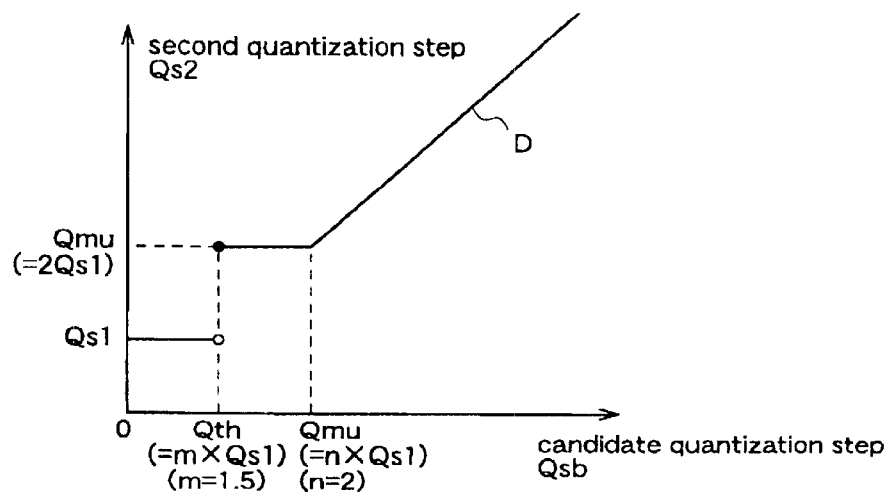
FIG. 6 is a graph illustrating the relationship between a second quantization step which is obtained by the quantization step derivation unit of the second embodiment and a candidate quantization step which is output from a candidate quantization step derivation unit as a constituent of the quantization unit of the second embodiment.

FIG. 6 shows, with a graph D, the relationship between the second quantization step Qs2 obtained by the quantization step derivation unit 252 and the candidate quantization step Qsb output from the candidate quantization step derivation unit 250. In this second embodiment, m and n are 1.5 and 2, respectively.

As seen from the graph D, when the candidate quantization step Qsb is smaller than the threshold Qth, the first quantization step Qs1 is output as the second quantization step Qs2 from the quantization step derivation unit 252. When the candidate quantization step Qsb is equal to or larger than the threshold Qth (=1.5×Qs1) and smaller than the constant multiple Qmu (=2×Qs1), a value twice as large as the first quantization step Qs1 (2×Qs1) is selected as the second quantization step Qs2. When the candidate quantization step Qsb is equal to or larger than the constant multiple Qmu (=2×Qs1), the candidate quantization step Qsb is selected as the second quantization step Qs2.

Next, the operation of the transcoding system will be described.

In this second embodiment, the fundamental operation of the transcoding system is identical to that of the transcoding system 10 according to the first embodiment, except the operation of the quantization step derivation unit 252 included in the quantization unfit 152. Therefore, only the operation of the quantization step derivation unit 252 will be described hereinafter.

In the transcoding system of this second embodiment, when the reproduced data Rg supplied from the decoding unit Da1 is subjected to a coding process including a quantization process by the encoding unit Ea1, in the quantization unit 152, the candidate quantization step derivation unit 250 generates a candidate quantization step Qsb. Then, in the quantization step derivation unit 252, one of the first quantization step Qs1, the constant multiple Qmu, and the candidate quantization step Qsb is selected as the second quantization step, on the basis of the threshold Qth and the constant multiple Qmu which have been obtained from the first quantization step Qs1 supplied from the inverse quantization unit 101a of the decoding unit Da1. In the quantizer 201, frequency-domain data Tg is subjected to quantization based on the second quantization step Qs2.

When the first quantization step Qs1 is supplied from the decoding unit Da1 to the quantization step derivation unit 252, the threshold derivation unit 262 derives a predetermined threshold Qth by multiplying the first quantization step Qs1 with m, and outputs this threshold Qth to the comparator 263. In the comparator 263, the candidate quantization step Qsb supplied from the candidate quantization step derivation unit 250 is compared with the threshold Qth supplied from the threshold derivation unit 262, and a comparison output CP2 indicating the result of comparison is output to the switch 264. In the switch 264, either the first quantization step Qs1 or the candidate quantization step Qsb is selected on the basis of the comparison output CP2, and the selected step is output as a selected quantization step Qse to the switch 267.

At this time, in the constant multiplier 265, a constant multiple Qmu is generated by multiplying the first quantization step Qs1 supplied from the decoding unit Da1, with n, and this constant multiple Qmu is output to the switch 267 and to the comparator 266. In the comparator 266, the candidate quantization step Qsb supplied from the candidate quantization step derivation unit 250 is compared with the constant multiple Qmu supplied from the constant multiplier 265, and a comparison output CP3 indicating the result of comparison is output to the switch 267. In the switch 267, either the constant multiple Qmu or the selected quantization step Qse is selected to be output as the second quantization step Qs2.

As described above, the transcoding system according to the second embodiment is provided with the candidate quantization step derivation unit 250 which derives a candidate quantization step Qse on the basis of the relationship between the bit rate of the transcoded data and the quantization distortion included in the transcoded data; and the quantization step derivation unit 252 which derives a quantization step (second quantization step) for the transcoding process, on the basis of the candidate quantization step Qsb and the first quantization step Qs1 which is used in the inverse quantization process. When the candidate quantization step Qsb has a value within an optimum range which is determined according to the relationship in relative sizes among the candidate quantization step Qsb, the first quantization step Qsi, and the constant multiple Qmu, the candidate quantization step Qsb is output as the second quantization step Qs2. When the candidate quantization step Qsb has a value outside the range, the first quantization step Qs1 or its constant-multiple quantization step Qmu is output. Therefore, the transcoding process for the coded data Eg1 can be performed while effectively suppressing the quantization error, without increasing the number of bits.

In this second embodiment, when the candidate quantization, step Qsb is smaller than the constant multiple Qmu (n×first quantization step Qs1), the second quantization step Qs2 is rounded to the first quantization step Qs1 or to the constant multiple Qmu, on the basis of the threshold Qth (m×Qs1) However, the threshold Qth may be varied.

For example, the threshold Qth may be varied so that the second quantization step Qs2 frequently changes between the first quantization step Qs1 and the constant multiple Qmu. In this case, highly-responsive rate control to bring the coding bit rate close to a target bit rate, is achieved.

More specifically, the threshold Qth is varied as follows, and a quantization step Qs2 is decided according to a new threshold Qth' obtained.

Initially, the average of the candidate quantization steps Qsb is obtained at a target average quantization step Qt, and the average of the second quantization steps Qs2 is obtained as a practical average quantization step Qave.

When the practical average quantization step Qave is larger than the target average quantization step Qt, in other words, when the candidate quantization steps Qsb are relatively small values on average, Qth'=Qth/2 is used as a new threshold. However, when Qth' is smaller than Qs1, Qth'=Qs1.

On the other hand, when the practical average quantization step Qave is smaller than the target average quantization step Qt, in other words, when the candidate quantization steps Qsb are relatively large values on average, Qth'=Qth+Qth/2 is used as a new threshold. However, when Qth' is larger than Qmu, Qth'=Qmu.

Embodiment 3

Figure 8:
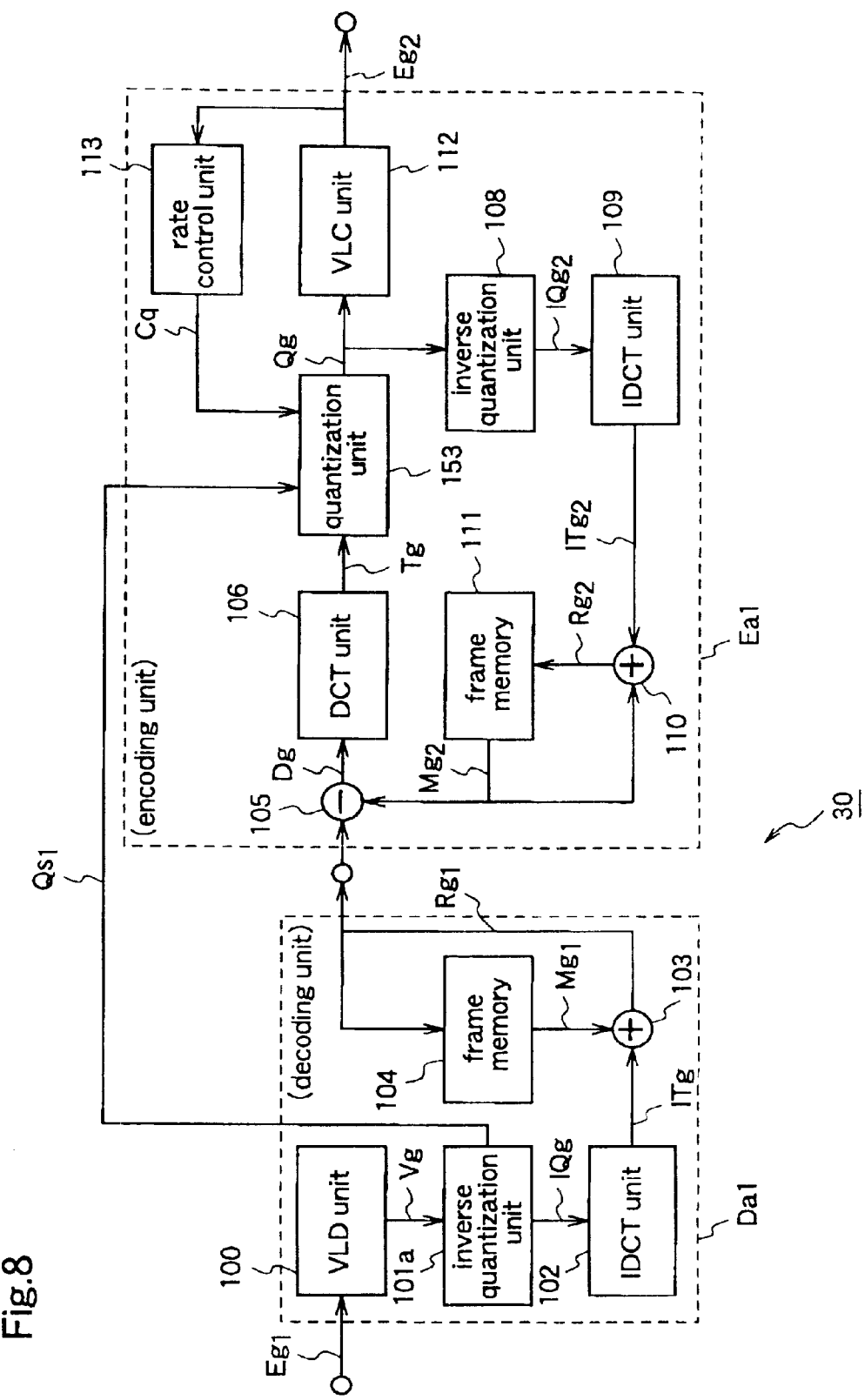
FIG. 8 is a block diagram for explaining a transcoding system according to a third embodiment of the present invention.

FIG. 8 is a block diagram for explaining a transcoding system 30 according to a third embodiment of the present invention.

The transcoding system 30 according to this third embodiment has a quantization unit 153 which derives quantization steps adapted to intra-frame coding and inter-frame coding, respectively, and performs quantization with these quantization steps, instead of the quantization unit 151 according to the first embodiment. As the coding process is switched between intra-frame coding and inter-frame coding in units of blocks or frames, the quantization process is also switched between that adapted to the intra-frame coding (intra-frame quantization) and that adapted to the inter-frame coding (inter-frame quantization).

Figure 9:
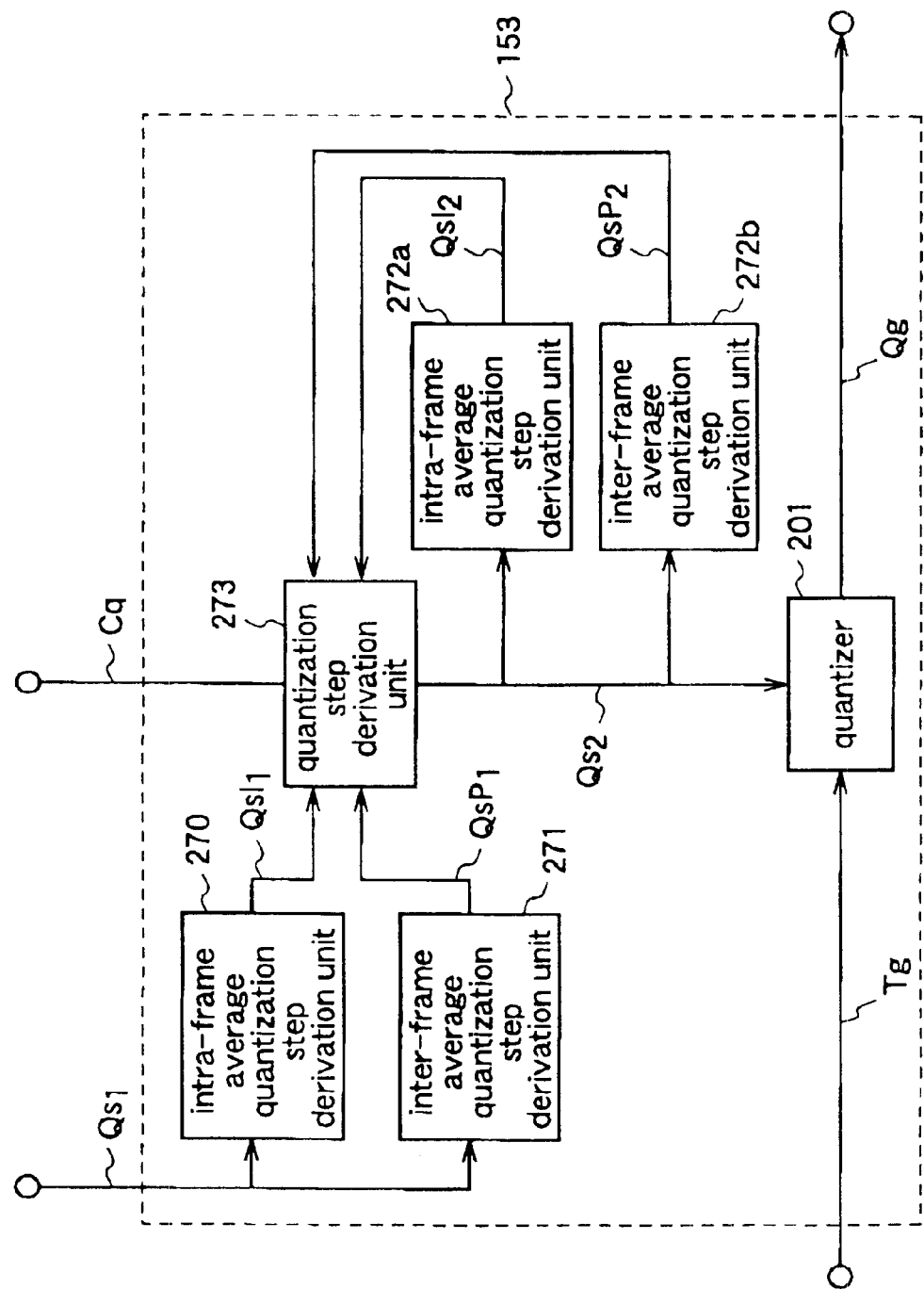
FIG. 9 is a block diagram for explaining a quantization unit which is a constituent of the transcoding system according to the third embodiment.

FIG. 9 is a block diagram illustrating the structure of the quantization unit 153 in detail.

The quantization unit 153 includes an intra-frame average quantization step derivation unit 270 and an inter-frame average quantization step derivation unit 271. The intra-frame average quantization step derivation unit 270 calculates a value Qintra (first intra-frame average quantization step QsI1) by averaging the quantization steps corresponding to the respective macroblocks in the intra-frame quantization process, for each frame, on the basis of the first quantization step Qs1 which has been used for inverse quantization in the decoding unit Da1. The inter-frame average quantization step derivation unit 271. calculates a value Qinter (first inter-frame average quantization step QsP1) by averaging the quantization steps corresponding to the respective macroblocks in the inter-frame quantization process, for each frame, on the basis of the first quantization step Qs1.

Further, the quantization unit 153 includes an intra-frame average quantization step derivation unit 272a and an inter-frame average quantization step derivation unit 272b. The intra-frame average quantization step derivation unit 272a calculates a value Qintra (second intra-frame average quantization step QsI1) by averaging the quantization steps corresponding to the respective macroblocks in the intra-frame quantization process, for each frame, on the basis of the second quantization step Qs2 which has been used for quantization of frames up to a previous frame which is immediately before the target frame to be coded. The inter-frame average quantization step derivation unit 272b calculates a value Qinter (second inter-frame average quantization step QsP2) by averaging the quantization steps corresponding to the respective macroblocks in the inter-frame quantization process, for each frame, on the basis of the second quantization step Qs2.

Furthermore, the quantization unit 153 includes a quantization step derivation unit 273 and a quantizer 201. The quantization step derivation unit 273 derives a quantization step Qs2 from the target number of bits, which is input as a quantization control signal Cq, with reference to the first and second intra-frame average quantization steps QsI1 and QsI2 and the first and second inter-frame average quantization steps QsP1 and QsP2. The quantizer 201 quantizes the output Tg from the DCT unit 106 on the basis of the second quantization step Qs2.

Figure 10:
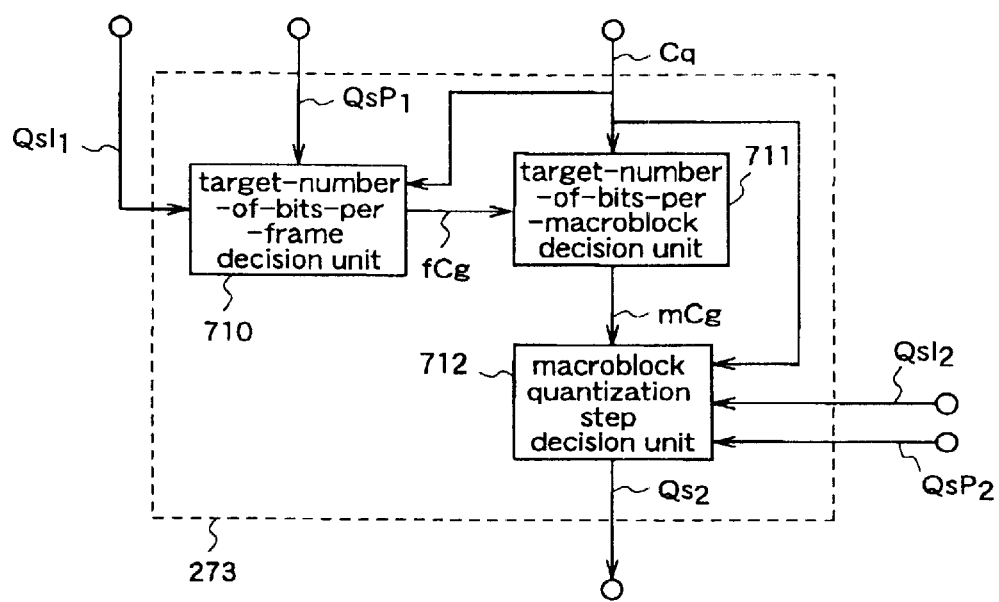
FIG. 10 is a block diagram for explaining a quantization step derivation unit which is a constituent of the quantization unit according to the third embodiment.

FIG. 10 is a block diagram illustrating the quantization step derivation unit 273 in detail.

The quantization step derivation unit 273 includes a decision unit 710 for deciding the target number of bits per frame, a decision unit 711 for deciding the target number of bits per macroblock, and a quantization step decision unit 712. More specifically, the decision unit 710 calculates the target number of bits fCg for a target frame to be subjected to re-quantization, from the target number of bits corresponding to a target macroblock to be processed, which is indicated by the quantization control signal Cq, on the basis of the first intra-frame average quantization step QsI1 and the first inter-frame average quantization step QsP1. The decision unit 711 generates the number of available bits mCg for the target macroblock, on the basis of the target number of bits fCg for the target frame and the quantization control signal Cq supplied from the rate control unit 113. The quantization step decision unit 712 decides a quantization step Qs2 for the target macroblock, on the basis of the number of bits mCg, the second intra-frame average quantization step QsI2, the second inter-frame average quantization step QsP2, and the quantization control signal Cq supplied from the rate control unit 113.

Now it is assumed that the value of the first intra-frame average quantization step QsI1 is Qintra, the value of the first inter-frame average quantization step QsP1 is Qinter, the number of coded bits per intra-frame coded frame is Nintra, the number of coded bits per inter-frame coded frame is Ninter, and the ratio of the intra-frame re-quantization step to the inter-frame re-quantization step is $\alpha \times$Qintra:Qinter so that the ratio of the re-quantization errors in the intra-frame coding process and the inter-frame coding process is corrected. Since the quantization step is in inverse proportion to the number of coded bits, the ratio of the number of bits per intra-frame coded frame to the number of bits per inter-frame coded frame after the re-quantization becomes Nintra/$\alpha$:Ninter. The value of $\alpha$ satisfies $0<\alpha<1$.

The decision unit 710 generates the target number of bits per frame fCg so that the ratio of the intra-frame coded frames to the inter-frame coded frames, relating to the number of bits per unit time output by the transcoding process, becomes Nintra/$\alpha \times$number of intra-frame coded frames: Ninter$\times$number of inter-frame coded frames.

Further, the decision unit 711 subtracts the number of bits which is generated in the coding process for the target macroblock in the target frame, from the target number of bits per frame fCg which is derived by the decision unit 710. Then, the decision unit 711 divides the number of residual bits in the target frame (i.e., the number of bits which are available in the coding process for the unprocessed macroblocks in the target frame) with the number of unprocessed macroblocks, and the number of bits so obtained is output to the macroblock quantization step decision unit 712 as the number of bits which are available for the macroblock to be coded.

Further, the relationship between the number of bits and the quantization step, corresponding to a macroblock, is as follows.

intra-frame coding quantization step=Kintra/number of bits available for macroblock to be processed (A)

inter-frame coding quantization step=Kinter/number of bits available for macroblock to be processed (B)

wherein Kintra and Kinter are constants. Further, the intra-frame coding quantization step is a quantization step which is used for each macroblock to be processed in the quantization process (intra-frame quantization process) in the intra-frame coding process, and the inter-frame coding quantization step is a quantization step which is used for each macroblock to be processed in the quantization process (inter-frame quantization process) in the inter-frame coding process.

The macroblock quantization step decision unit 712 obtains the values of Kintra and Kinter for each macroblock, on the basis of the target number of bits Cg supplied from the rate control unit 113, the intra-frame average quantization step QsI2, and the inter-frame average quantization step QsP2, according to the following formulae (C) and (D). Next, Kintra and Kinter in the above-mentioned formula (A) or (B) are updated with the obtained Kintra and Kinter, and the number of bits available for the macroblock to be coded is assigned to formulae (A) and (B), thereby deriving a quantization step Qs2 for each macroblock.

Kintra=intra-frame average quantization step$\times$(number of already intra-frame coded bits/number of already intra-frame coded Macroblocks) (C)

Kinter=inter-frame average quantization step$\times$(number of already inter-frame coded bits/number of already inter-frame coded macroblocks) (D)

Next, the function and effect will be described.

In the MPEG coding method or the like, the coding process for an image signal (image data) is switched, macroblock by macroblock or frame by frame, between intra-frame coding which utilizes the correlation of pixel values in a frame and inter-frame coding which utilizes the correlation of pixel values between frames. Further, in the coding process, the quantization method is also switched between a method suited to the intra-frame coding and a method suited to the inter-frame coding.

By the way, since the quantization error caused by the transcoding process depends on the quantization method, it is necessary to derive a quantization step suited to the type of the coding process to reduce the transcoding distortion.

Especially in the MPEG coding method, when the intra-frame coded data obtained by the intra-frame coding process and the inter-frame coded data obtained by the inter-frame coding process are subjected to transcoding, if these coded data are quantized with the same quantization step, the transcoding error of the intra-frame, coded data has a tendency to be larger than the transcoding error of the inter-frame coded data.

Therefore, in the transcoding process for the intra-frame coded data, it is necessary to perform transcoding with a quantization step finer than (i.e., smaller than) that used in the transcoding process for the inter-frame coded data. Further, the number of bits generated in the transcoding process for the intra-frame coded data should be the target number of bits.

That is, in the quantization step derivation unit 273 according to the third embodiment, an intra-frame coding quantization step and an inter-frame coding quantization step to be used in the quantization process of the quantizer 201 and the number of bits per frame to be generated in the transcoding process, are predicated on the basis of the average quantization steps which are output from the intra-frame average quantization step derivation unit 270 and the inter-frame average quantization step derivation unit 271. Then, in the quantization step derivation unit 273, based on these predicted values, an intra-frame coding quantization step and an inter-frame coding quantization step are decided so that the number of bits of each frame becomes a predetermined number of bits on average and, further, the intra-frame coding quantization step becomes finer than the inter-frame coding quantization step.

Further, in the intra-frame average quantization step derivation unit 272a and the inter-frame average quantization step derivation unit 272b, the average of the intra-frame quantization steps and the average of the inter-frame quantization steps, which are derived as the second quantization steps in the quantization step derivation unit 273, are calculated, respectively. Further, in the quantization step derivation unit 273, based on these averages, the relational expressions (formulae (A) and (B)) each indicating the relationship between the target number of bits and the quantization corresponding to each macroblock, are corrected.

Next, the operation of the transcoding system according to this third embodiment will be described. The operation of this transcoding system is identical to that of the transcoding system 10 according to the first embodiment except the operation of the quantization unit 153. Therefore, only the operation of the quantization unit 153 will be described hereinafter.

In the transcoding system of this third embodiment, when the data Rg generated in the decoding unit Da1 is subjected to a coding process including a quantization process in the encoding unit Ea1, in the quantization unit 153, the quantization step derivation unit 273 derives second quantization steps Qs2 suited to intra-frame coding and inter-frame coding, respectively, and the frequency-domain data Tg is quantized on the basis of the second quantization steps.

That is, when the first quantization step Qs1 is supplied from the decoding unit Da1 to the quantization unit 153, the intra-frame average quantization step derivation unit 270 and the inter-frame average quantization step derivation unit 271 calculate the first intra-frame average quantization step QsI1 and the first inter-frame average quantization step QsP1, from the input first quantization step Qs1, respectively. These quantization steps QsI1 and QsP1 are output to the quantization step derivation unit 273.

In the quantization step derivation unit 273, a second quantization step Qs2 is derived on the basis of the target number of bits indicated by the quantization control signal Cq, with reference to the quantization steps QsI1 and QsP1 and the second intra-frame average quantization step QsI2 and the second inter-frame average quantization step QsP2 for the already transcoded frames. The second quantization step Qs2 is output to the quantizer 201.

In the quantizer 201, the frequency-domain data Tg supplied from the DCT unit 106 of the encoding unit Ea1 is quantized on the basis of the second quantization step Qs2 so derived. Further, in the intra-frame average quantization step derivation unit 272a and the inter-frame average quantization step derivation unit 272b, the second intra-frame average quantization step QsI2 and the second inter-frame average quantization step QsP2 are calculated on the basis of the output. Qs2 from the quantization step derivation unit 273, respectively.

Hereinafter, the operation of the quantization step derivation unit 273 will be described by using FIG. 10.

When the quantization step derivation unit 273 is supplied with the first intra-frame average quantization step QsI1 from the intra-frame average quantization step derivation unit 270 and the first inter-frame average quantization step QsP1 from the inter-frame average quantization step derivation unit 271, the decision unit 710 calculates the target number of bits per frame fCg, from the target number of bits per macroblock which is indicated by the quantization control signal Cq from the rate control unit 113. The target number of bits per frame fCg is output to the decision unit 711.

In the decision unit 711, initially, the number of bits generated in the coding process for the already processed macroblocks in the target frame, and the number of unprocessed macroblocks, are calculated according to the quantization control signal Cq. Next, the number of bits generated in the coding process for the already processed macroblocks in the target frame is subtracted from the target number of bits per frame fCg supplied from the decision unit 710, whereby the number of residual bits in the target frame is obtained. Then, the number of residual bits in the target frame is divided by the number of the unprocessed macroblocks. The number of bits so obtained is output to the macroblock quantization step decision unit 712, as the number of bits mCg available for a macroblock to be processed.

On receipt of the number of bits mCg, the macroblock quantization step decision unit 712 derives a quantization step Qs2 for the macroblock to be processed, with reference to the quantization control signal Cq output from the rate control unit 113, the second average quantization step QsI2 output from the intra-frame average quantization step derivation unit 272a, and the second average quantization step QsP2 output from the inter-frame average quantization step derivation unit 272b, on the basis of the relationship between the number of bits and the quantization step corresponding to the macroblock (formulae (A)~(D)).

As described above, in the transcoding system 30 according to the third embodiment, the quantization step derivation unit 273 derives the second quantization step corresponding to each macroblock so that the ratio of the re-quantization errors between the intra-frame coding-process and the inter-frame coding process is corrected. Therefore, the transcoding system 30 can perform the transcoding process including the intra-frame coding process and the inter-frame coding process, while effectively suppressing an increase in the quantization error.

Embodiment 4

Figure 11:
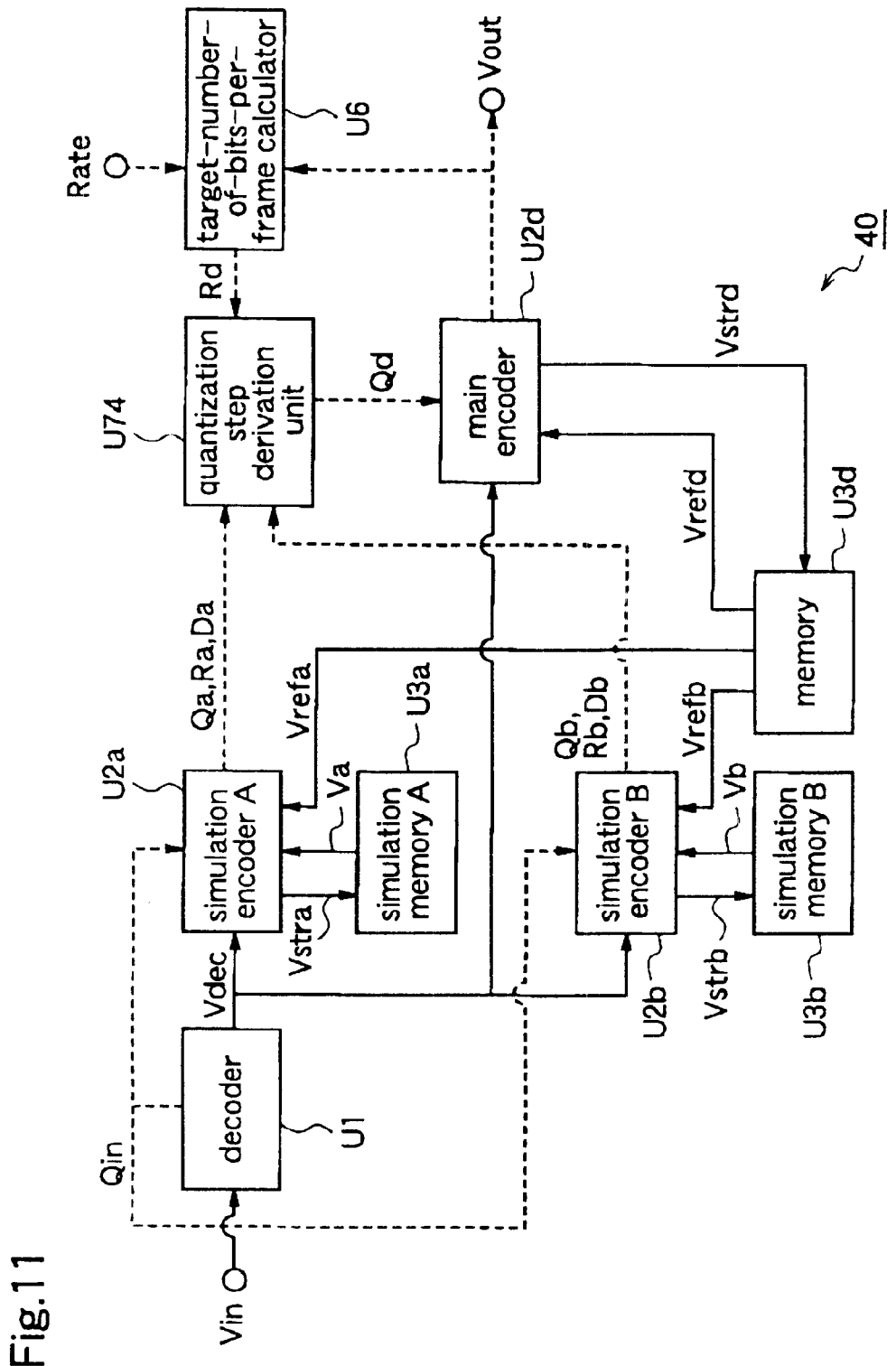
FIG. 11 is a block diagram for explaining a transcoding system according to a fourth embodiment of the present invention.

FIG. 11 is a block diagram for explaining a transcoding system 40 according to a fourth embodiment of the present invention.

The transcoding system 40 includes a decoder U1, a simulation encoder A (U2a), and a simulation encoder B (U2b).

The decoder U1 subjects an input stream Vin to a decoding process including an inverse quantization process, for every coding unit, and outputs decoded image data (decoded stream) Vdec as well as a quantization step Qin used in the inverse quantization process. The simulation encoder A subjects the decoded image data Vdec, for every coding unit, to a first simulation coding process including a quantization process using a quantization step Qa and a local decoding process, with reference to image data of a reference frame. The simulation encoder B subjects the decoded image data Vdec, for every coding unit, to a second simulation coding process including a quantization process using a quantization step Qb larger than the quantization step Qa and a local decoding process, with reference to image data of a reference frame. The input stream Vin is coded image data which has been obtained by subjecting image data to a coding process including a quantization process, for every coding unit. The coding unit is an area (macroblock) comprising 16×16 pixels in one frame.

The simulation encoder A outputs, for each coding unit (macroblock), locally-decoded image data Vstra obtained by the local decoding process included in the first simulation coding process; the quantization step Qa corresponding to each coding unit, which is used in the quantization process included in the simulation coding process; a coding error (simulation coding error) Da corresponding to each coding unit, which is generated in the simulation coding process; and the number of bits (number of simulation-coded bits) Ra per coding unit, which is generated in the simulation coding process. The simulation encoder B outputs, for each coding unit (macroblock), locally-decoded image data Vstrb obtained by the local decoding process included in the second simulation coding process; the quantization step Qb which is used in the quantization process included in the simulation coding process; a coding error (simulation coding error) Db which is generated in the simulation coding process; and the number of bits (number of simulation-coded bits) Rb per macroblock, which is generated in the simulation coding process.

Further, the transcoding system 40 includes a simulation memory A (U3a) which stores the locally-decoded image data Vstra output from the simulation encoder A, and a simulation memory B (U3b) which stores the locally-decoded image data Vstrb output from the simulation encoder B.

Further, the transcoding system 40 includes a quantization step derivation unit U74 which selects either the quantization step Qa or the quantization step Qb, as an optimum quantization step Qd corresponding to each coding unit, on the basis of the quantization step Qa, the simulation coding error Da, and the number of simulation-coded bits Ra, which are output from the simulation encoder A, and the quantization step Qb, the simulation coding error Db, and the number of simulation-coded bits Rb, which are output from the simulation encoder B, and the number of bits Rd assigned to each frame (target number of bits per frame). To be specific, in the quantization step derivation unit U74, a transcoding error increasing rate λ is obtained for each coding unit, on the basis of the quantization steps Qa and Qb, the simulation coding errors Da and Db, and the numbers of simulation-coded bits Ra and Rb, and either the quantization step Qa or the quantization step Qb is selected as a quantization step for each coding unit so that the transcoding error increasing rate λ corresponding to each macroblock becomes as constant as possible.

The transcoding system 40 further includes a main encoder U2d which subjects the decoded image data Vdec to a transcoding process including a quantization process with a quantization step Qd and a local decoding process, with reference to image data of a reference frame, and outputs a transcoded stream Vout as well as locally-decoded image data Vstrd obtained by the local decoding process. The transcoding system 40 further includes a main memory U3d which stores the locally-decoded image data Vstrd, and a calculator U6 which calculates the target number of bits per frame Rd on the basis of a target bit rate Rate supplied from the outside and the bit rate of the transcoded stream Vout.

The simulation memory A stores the locally decoded image data Vstra supplied from the simulation encoder A, and outputs the stored data to the simulation encoder A as image data Va of a reference frame (reference image data) when performing simulation coding on an unprocessed frame subsequent to the target frame (frame being processed). The simulation memory B stores the locally decoded image data Vstrb supplied from the simulation encoder B, and outputs the stored data to the simulation encoder B as image data Vb of a reference frame (reference image data) when performing simulation coding on an unprocessed frame subsequent to the target frame. The main memory U3d outputs the locally decoded image data Vstrd to the main encoder U2d as image data Vrefd of a reference frame (reference image data) when performing transcoding on an unprocessed frame subsequent to the target frame. Further, the main memory U3d outputs the locally decoded image data Vstrd to the simulation encoders A and B as image data Vrefa and Vrefb of reference frames when performing first and second simulation coding processes on an unprocessed frame subsequent to the target frame, respectively.

Since the main memory U3d contains the locally decoded image data corresponding to the transcoded stream which is actually output, the simulation encoders A and B refer to the image data Vrefa and Vrefb of the already coded frames which are stored in the main memory U3d, instead of the image data Va and Vb of the already coded frames stored in the simulation memories A and B.

Next, a description will be given of the transcoding error increasing rate λ which is used by the quantization step derivation unit U74 of this fourth embodiment.

Figure 12:
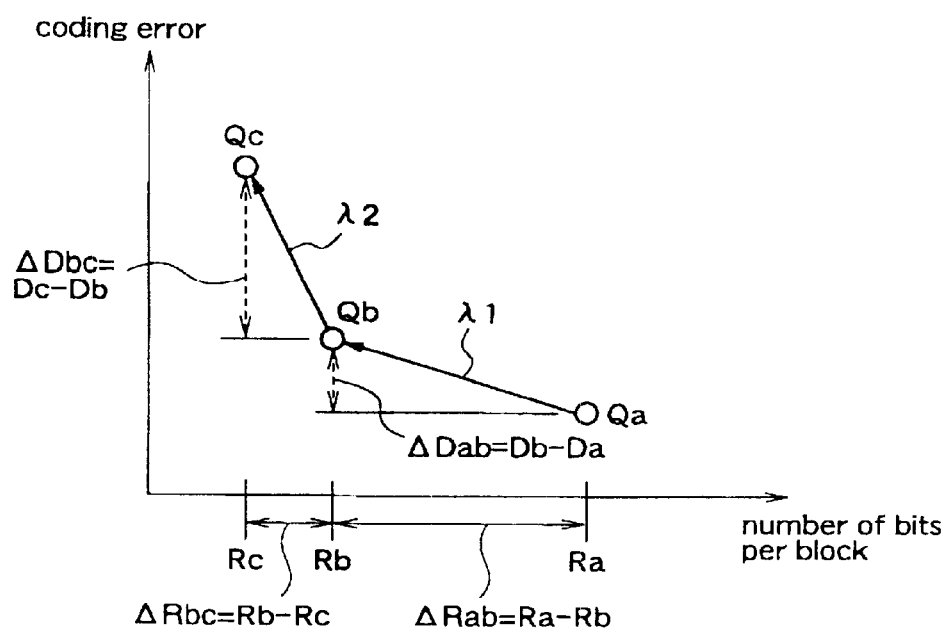
FIG. 12 is a graph illustrating the relationship between a simulation coding error which occurs due to simulation coding of decoded image data, and the number of bits per coding unit, which is generated by the simulation coding (number of simulation-coded bits) in the transcoding system according to the fourth embodiment.

FIG. 12 is a diagram for explaining the relationship between the simulation coding error which occurs in the simulation coding process for the decoded image data Vdec by the first (second) simulation encoder U3a (U3b), and the number of bits per coding unit (macroblock) which are generated in the simulation coding process.

The actual coding error Dra (Drb) included in the simulation coded stream generated by the simulation encoder U3a (U3b) is the sum of the coding error Din included in the input stream Vin and the simulation coding error Da (Db) which occurs in the simulation coding process.

That is, the actual coding error Dra included in the first simulation coding stream which is obtained by subjecting the decoded image data Vdec to the first simulation coding process including the quantization process using the quantization step Qa, is represented by $$Dra = Din + Da \qquad (1)$$

On the other hand, the actual coding error Drb included in the second simulation coding stream which is obtained by subjecting the decoded image data Vdec to the second simulation coding process including the quantization process using the quantization step Qb, is represented by $$Drb = Din + Db \qquad (2)$$

Accordingly, a difference ΔDab between the actual coding errors included in the first and second simulation coded streams is represented by the following formula (3). In formula (3), the coding error Db due to the second simulation coding process is larger than the coding error Da due to the second simulation coding process because the quantization step Qb used in the second simulation coding process is larger than the quantization step Qa used in the first simulation coding process.

$$\Delta Dab = Drb - Dra \quad (3)$$
$$= (Din + Db) - (Din + Da)$$
$$= Db - Da$$

Further, a difference ΔRab between the number of bits per coding unit Ra which is obtained by the first simulation coding process (the number of first-simulation-coded bits) and the number of bits per coding unit Rb obtained by the second simulation coding process (the number of second-simulation-coded bits) is represented by the following formula (4). In formula (4), the number of second-simulation-coded bits Rb is smaller than the number of first-simulation-coded bits Ra because the quantization step Qb used in the second simulation coding process is larger than the quantization step Qa used in the first simulation coding process.

$$\Delta Rab = Ra - Rb \quad (4)$$

Therefore, the transcoding error increasing rate λ1 (variation in the number of simulation-coded bits per unit variation in the bit rate) is represented by $$\lambda 1 = \Delta Dab / \Delta Rab \quad (5)$$
$$= (Db - Da)/(Ra - Rb)$$

Generally, as the quantization step in the coding process increases, the variation in the coding error per unit number of bits increases.

Therefore, in the quantization step derivation unit U74 which selects either the quantization step Qa of the first simulation coding process or the quantization step Qb of the second simulation coding process as an optimum quantization step Qd for each coding unit, in order to minimize the coding error (i.e., in order to make the transcoding error increasing rates λ1 of the respective coding units (macroblocks) in one frame as equal as possible in the frame), the larger quantization step Qb is used as an optimum quantization step Qd for the coding units having relatively small transcoding error increasing rates λ1 while the smaller quantization step Qa is used as the optimum quantization step Qd for the coding units having relatively large transcoding error increasing rates λ1.

Figure 13:
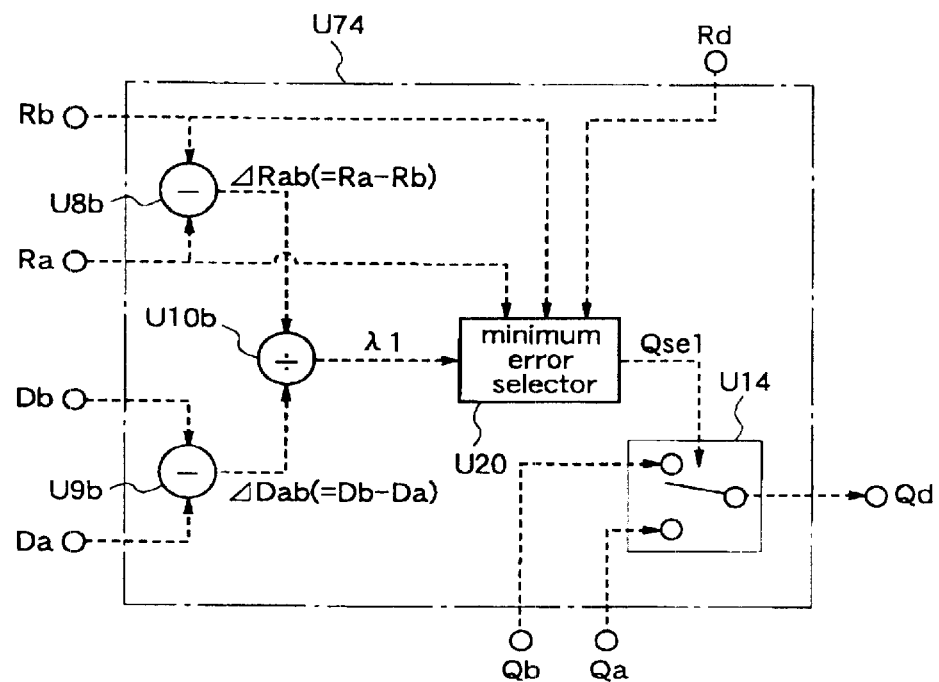
FIG. 13 is a block diagram for explaining a quantization step derivation unit which is a constituent of the transcoding system of the fourth embodiment.
Figure 14:
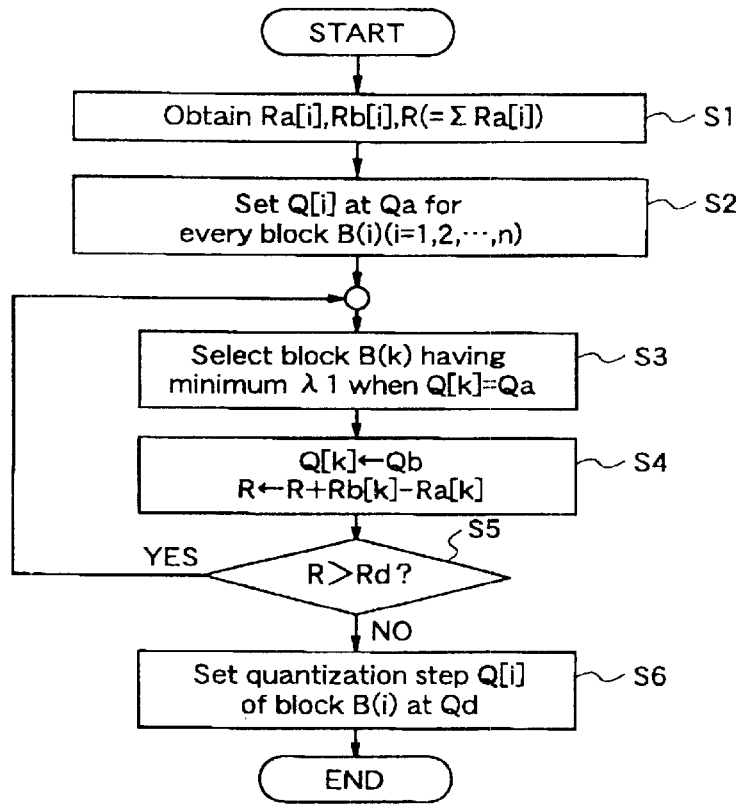
FIG. 14(a) is a flowchart of a process for deriving an optimum quantization step for each coding unit.
FIG. 14(b) shows an arrangement of coding units in one frame.
FIG. 14(c) shows the state where optimum quantization steps Qd are assigned to the respective coding units.
Figure 14:
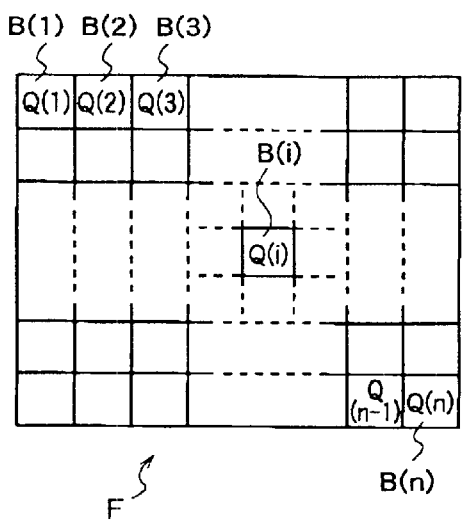
Figure 14:
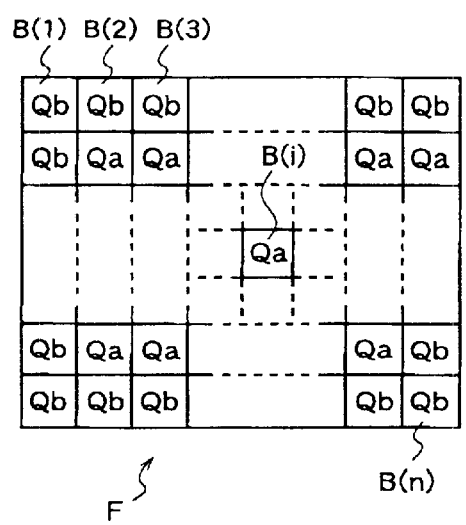

FIG. 13 is a block diagram illustrating the quantization step derivation unit U74 in more detail.

The quantization step derivation unit U74 includes a number-of-bits subtracter U8b and an error subtracter U9b. The number-of-bits subtracter U8b receives the number of first-simulation-coded bits Ra and the number of second-simulation-coded bits Rb, which have been generated by the first and second simulation coding processes and supplied from the simulation encoders A and B, respectively, and calculates a difference between these numbers of simulation-coded bits as an increase in the number of simulation-coded bits ΔRab. The error subtracter U9b receives the simulation coding errors (transcoding errors) Da and Db supplied from the simulation encoders A and B, and calculates a difference between these errors as an increase in simulation coding error ΔDab.

Further, the quantization step derivation unit U74 includes a divider U10b, a selector switch U14, and a minimum error selector U20. The divider U10b divides the increase in simulation coding error ΔDab by the increase in the number of simulation-coded bits ΔRab to derive a transcoding error increasing rate λ1. The selector switch U14 selects either the quantization step Qa from the simulation encoder A or the quantization step Qb from the simulation encoder B in accordance with a control signal Qse1, and outputs an optimum quantization step Qd corresponding to the coding unit being processed. The minimum error selector U20 compares the transcoding error increasing rates λ1 of the respective macroblocks, and controls the selector switch 14 by using the control signal Qse1 so that the number of bits per frame (the number of bits in the transcoded stream corresponding to one frame) becomes the target number of bits per frame Rd.

Next, the operation of the transcoding system 40 will be described.

When an input stream Vin (coded stream) is supplied to the transcoding system 40, in the decoder U1; the coded stream Vin is subjected to a decoding process including an inverse quantization process, and a decoded stream (decoded image data) Vdec and a quantization step Qin used in the inverse quantization process are output for each coding unit (macroblock).

In the simulation encoder A (U2a), the decoded stream Vdec corresponding to the target frame being processed is subjected to, for each coding unit, a first simulation coding process including a quantization process using the quantization step Qa and a local decoding process, with reference to the reference image data Va stored in the simulation memory A or the reference image data Vrefa stored in the main memory U3d. The quantization step Qa is set so that it is not smaller than the quantization step Qin used in the inverse quantization process. Thereby, not only locally-decoded image data Vstra but also the quantization step Qa, the number of simulation-coded bits Ra, and the simulation coding error Da, are output from the simulation encoder A.

Likewise, in the simulation encoder B (U2b), the decoded stream Vdec corresponding to the target frame being processed is subjected to, for each coding unit, a second simulation coding process including a quantization process using the quantization step Qb and a local decoding process, with reference to the reference image data Vb stored in the simulation memory B or the reference image data Vrefb stored in the main memory U3d. The quantization step Qb is set so that it is not smaller than the quantization step Qin used in the first simulation coding process and is larger than the quantization step Qa. Thereby, not only locally-decoded image data Vstrb but also the quantization step Qb, the number of simulation-coded bits Rb, and the simulation coding error Db, are output from the simulation encoder B.

At this time, the locally-decoded image data Vstra and Vstrb are stored as image data corresponding to the frame which has already been coded, in the simulation memories A and B, respectively. The image data stored in the simulation memories A and B are used as the above-described reference image data Va and Va when decoded data corresponding to an unprocessed frame is coded.

In the quantization step derivation unit U74, an optimum quantization step Qd corresponding to each coding unit is derived so that the number of coded bits corresponding to the target frame being processed does not exceed the target number of bits per frame Rd, on the basis of the quantization steps Qa and Qb from the simulation encoders A and B, the numbers of simulation-coded bits Ra and Rb, and the simulation coding errors Da and Db.

The optimum quantization step Qd is supplied to the main encoder U2d. In the main encoder U2d, the decoded image data Vdec is subjected to a transcoding process including a quantization process using the quantization step Qd and a local decoding process, with reference to the reference image data Vrefd stored in the main memory U3d. Thereby, a transcoded stream Vout and locally-decoded image data Vstrd are output from the main encoder U2d.

At this time, the locally-decoded image data Vstrd is stored in the main memory U3d as image data corresponding to a frame which has already been coded. The image data so stored in the main memory U3d is used as the above-described reference image data Vrefd when image data corresponding to an unprocessed frame is subjected to transcoding. Further, it is also used as the above-described reference image data Vrefa or Vrefb when image data corresponding to an unprocessed frame is subjected to the first or second simulation coding.

The locally-decoded image data corresponding to the transcoded stream Vout which is actually output is stored in the main memory U3d. Therefore, in the simulation encoders A and B, the image data of the already-coded frames which are stored in the main memory U3d are used as the reference image data Vrefa and Vrefb, instead of the image data (reference image data) Va and Vb of the already-coded frames which are stored in the simulation memories A and B.

Further, the transcoded system Vout is supplied to the calculator U6 for calculating the target number of bits per frame. In the calculator U6, the target number of bits Rd for a target frame subsequent to the already-coded frame is calculated on the basis of the bit rate of the transcoded stream Vout and a target bit rate Rate supplied from the outside, and the target number of bits Rd is output to the quantization step derivation unit U74.

Hereinafter, the operation of the quantization step derivation unit U74 will be described in detail.

Initially, in the number-of-bits subtracter U8b, the number of second-simulation-coded bits Rb is subtracted from the number of first-simulation-coded bits Ra to obtain a difference ΔRab between these numbers of simulation-coded bits (a variation in the number of simulation-coded bits). Further, in the error subtracter U9b, the simulation coding error Da from the simulation encoder A is subtracted from the simulation coding error Db from the simulation encoder B to obtain a difference ΔDab between these simulation coding errors (a variation in the simulation coding error). Further, in the divider U10b, the variation ΔDab; in the simulation coding error is divided by the variation ΔRab in the number of simulation-coded bits, thereby deriving the above-described transcoding error increasing rate λ1.

In the minimum error selector U20, the transcoding error increasing rates λ1 of the respective coding units (macroblocks) are compared with each other. According to the result of comparison, a control signal Qse1 is output to the selector switch U14, which control signal instructs the switch U14 to select, for each coding unit, one of the quantization steps Qa and Qb supplied from the simulation encoders A and B so that the number of bits per frame (the number of bits in the transcoded stream corresponding to one frame) does not exceed the target number of bits per frame Rd.

In the selector switch U14, based on the control signal Qse1, either the quantization step Qa or the quantization step Qb is selected for each coding unit, and the selected quantization step is output as an optimum quantization step Qd.

Next, the operation of the minimum error selector U20 will be described in more detail.

FIGS. 14(a)–14(c) are diagrams for explaining the process of deriving the optimum quantization step for each coding unit by using the minimum error selector U20. FIG. 14(a) is a flowchart of the process, and FIG. 14(b) schematically shows the arrangement of coding units in one frame. FIG. 14(c) schematically shows the state where each of the optimum quantization steps Qd corresponding to the respective coding units in one frame is set to either the quantization step Qa or the quantization step Qb, which are used in the first and second simulation coding processes, respectively.

The coding unit is a display area (macroblock) comprising 16×16 pixels, and one frame comprises n pieces of macroblocks. Further, a variable indicating the quantization step corresponding to the i-th (i=1, 2, . . . , n) macroblock B[i] in one frame represented by Q[i]. The numbers of simulation-coded bits which are obtained by subjecting the decoded image data corresponding to the i-th macroblock B[i] to simulation coding processes including quantization processes using the quantization steps Qa and Qb are represented by Ra[i] and Rb[i], respectively. In the following description with respect to FIG. 14, "macroblock" is called simply as "block".

In the minimum error selector U20, the process of deciding the optimum quantization step for each block in a target frame to be processed is as follows. Initially, the number of first-simulation-coded bits Ra[i] and the number of second-simulation-coded bits Rb[i] are obtained when the decoded image data of each block B[i] is subjected to the first and second coding processes including the quantization processes using the quantization steps Qa and Qb, respectively. Further, the sum R(=ΣRa[i]) of the numbers of first-simulation-coded bits Ra[i] corresponding to all of the blocks in the target frame is calculated (step S1).

Next, for all of the blocks in the target frame, the variables Q[i] indicating the corresponding quantization steps are initialized with the quantization step Qa (step S2). That is, at this point of time, the quantization steps Q[i] corresponding to the respective blocks B[i] in the target frame are once set at Q[i]=Qa. As the result, the sum R of the numbers of simulation-coded bits Ra[i] corresponding to all of the blocks in the target frame is represented by R=ΣRa[i].

Thereafter, a block B[k], which has the quantization step Q[i]=Qa and the minimum transcoding error increasing rate λ1 (=(Db−Da)/(Ra−Rb)), is retrieved. (step S3).

Next, the quantization step Q[k] of the retrieved block B[k] is changed from the quantization step Qa to the larger quantization step Qb, whereby the sum R of the numbers of simulation-coded bits corresponding to all of the blocks in the target frame are updated to R+Rb[k]−Ra[k] (step S4).

Then, it is decided whether or not the sum R is larger than the target number of bits per frame Rd (step S5). When the sum R is larger than the target number of bits per frame Rd, the above-described steps S3–S5 are repeated. On the other hand, when the sum R is equal to or smaller than the Rd, the value (Qa or Qb) of the quantization step Q[i] of each block in the target frame at this point of time (refer to FIG. 14 (c)) is output as an optimum quantization step Qd corresponding to each block (step S6).

As described above, the transcoding system 40 according to this fourth embodiment is provided with the simulation encoders A and B (U2a and U2b) which subject the decoded image data (decoded stream obtained by decoding the input stream) Vdec to the first and second simulation coding processes including the quantization processes using the quantization steps Qa and Qb, respectively, for each coding unit (macroblock). According to the result from each simulation coding process, the transcoding error increasing rates $\lambda 1$ corresponding to the respective coding units are obtained, and the quantization step Qb which is larger than the quantization step Qa is assigned to the coding units in the target frame, starting from one having the smallest transcoding error increasing rate $\lambda 1$, in the ascending order, so that the sum of the numbers of coded bits of all the coding units in the target frame does not exceed the target number of bits per frame Rd, and the smaller quantization step Qa is assigned to the residual coding units in the target frame. Therefore, the transcoding error increasing rates of the respective coding units in the target frame are converged to a constant value. Thereby, even in the transcoding process where the coding error included in the input stream Vin is unknown, the transcoding error can be reduced, whereby degradation of quality of the image reproduced from the transcoded stream Vout is minimized.

In this fourth embodiment, a macroblock (an area comprising 16×16 pixels in one frame) is employed as the coding unit. However, the coding unit is not restricted to a macroblock which is used in MPEG. For example, the coding unit may be a subblock comprising 8×8 pixels (one macroblock comprises four subblocks), or a slice comprising a plurality of macroblocks.

Further, the transcoding system of this fourth embodiment is provided with the simulation encoders A and B which perform the first and second simulation coding processes on only the frame to be subjected to the transcoding process in the main encoder U2d. However, the structure of the transcoding system is not restricted to this.

For example, in the case where the transcoding system performs inter-frame predictive coding based on MPEG, the simulation encoders A and B may perform the simulation coding processes not only on the target frame to be subjected to the transcoding process in the main encoder U2d but also on other frames which use this target frame as a reference frame when being subjected to the transcoding process.

Figure 23:
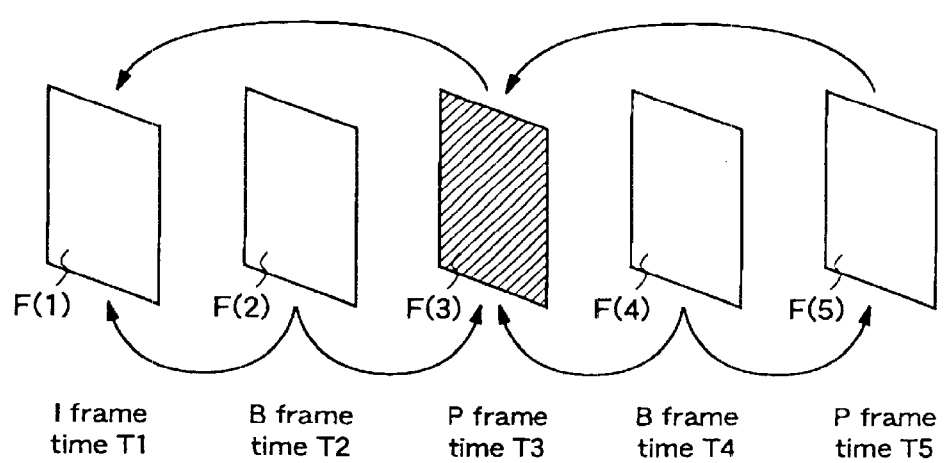
FIG. 23 is a schematic diagram for explaining inter-frame predictive coding based on MPEG.

The transcoding system so constructed will be described in more detail by using FIG. 23. That is, in the case where a P frame F(3) for which display time T3 is set as shown in FIG. 23 is to be subjected to transcoding in the main encoder U2d, the simulation encoders A and B perform simulation coding not only on the P frame F(3) but also on B frames F(2) and F(4) for which display times T2 and T4 are set and a P frame F(5) for which display time T5 is set. Further, for every coding unit (macroblock) in the frames F(2) to F(5), the simulation coding errors Da and Db and the numbers of simulation-coded bits Ra and Rb are calculated, and thereby the transcoding error increasing rate $\lambda 1$ is obtained. Furthermore, for every coding unit in the frames F(3), either the quantization step Qa or the quantization step Qb is set as the optimum quantization step on the basis of the transcoding error increasing rates $\lambda 1$ corresponding to all of the coding units in the frames F(2) to F(5).

In this case, the optimum quantization step corresponding to each coding unit in the frame F(3) is set so that the coding errors of the frames F(3), F(2), F(4), and F(5) are minimized.

It is needless to say that the P frame F(3) is a frame to be referred to when the B frames F(2) and F(4) and the P frame F(5) are subjected to inter-frame coding.

Embodiment 5

Figure 15:
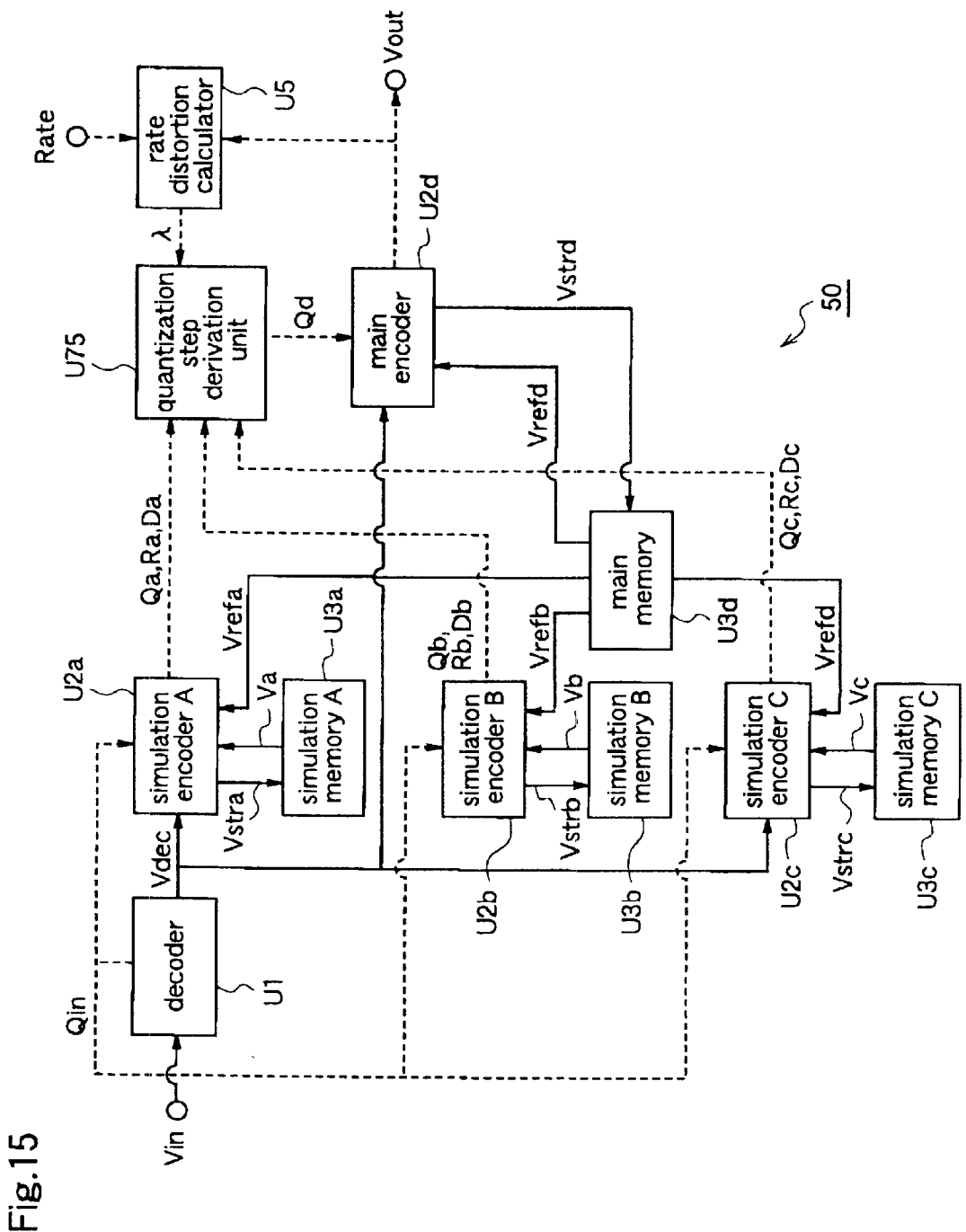
FIG. 15 is a block diagram for explaining a transcoding system according to a fifth embodiment of the present invention.

FIG. 15 is a block diagram for explaining a transcoding system 50 according to a fifth embodiment of the present invention.

The transcoding system 50 of this fifth embodiment includes a simulation encoder C (U2c) in addition to the simulation encoders A and B (U2a and U2b) described for the fourth embodiment. The simulation encoder C subjects the decoded image data (decoded stream) Vdec supplied from the decoder U1 to a third simulation coding process including a quantization process using a quantization step Qc which is larger than the quantization step Qb and a local decoding process, for each coding unit, with reference to image data of a reference frame. The simulation encoder C outputs, for each coding unit, not only locally decoded image data Vstrc obtained in the local decoding process but also the quantization step Qc used in the quantization process, a coding error Dc generated in the simulation coding process (simulation coding error), and the number of simulation-coded bits Rc, which is obtained in the simulation coding process.

Further, the transcoding system 50 includes a simulation memory C (U3c) in addition to the simulation memories A and B (U3a and U3b) described for the fourth embodiment. Further, the simulation memory C stores the locally decoded image data Vstrc supplied from the simulation encoder C, and outputs the stored image data to the simulation encoder C as image data Vc of a reference frame to be referred to when performing simulation coding on an unprocessed frame which follows the target frame.

Further, in the transcoding system 50, the main memory U3d outputs the stored locally decoded image data Vstrd to the main encoder U2d as image data Vrefd of a reference frame (reference image data) when performing transcoding on an unprocessed frame which follows the target frame, and to the simulation encoders A, B, and C as image data Vrefa, Vrefb, and Vrefc of a reference frame (reference image data) when performing first, second, and third simulation coding processes on an unprocessed frame which follows the target frame.

Since the main memory U3d stores the locally decoded image data corresponding to the transcoded stream which is actually output, the simulation encoders A, B, and C refer to the image data Vrefa, Vrefb, and Vrefc of the already coded frame which is stored in the main memory U3d instead of the image data Va, Vb, and Vc of the already coded frame which is stored in the simulation memories A, B, and C.

Further, the transcoding system 50 includes a rate distortion calculator U5 instead of the calculator U6 for calculating the target number of bits per frame,which is included in the transcoding system of the fourth embodiment. The rate distortion calculator U5 compares the bit rate of the transcoded stream Vout (the current bit rate) with a target bit rate Rate supplied from the outside on the basis of the transcoded stream Vout from the main memory U2d, and calculates a transcoding error increasing rate $\lambda$ corresponding to the target frame in accordance with the result of comparison.

Based on the transcoded stream Vout corresponding to each frame, the rate distortion calculator U5 outputs a relatively large value as a transcoding error increasing rate $\lambda$ corresponding to a target coding unit when the average bit rate of the frame being coded is likely to be larger than the target bit rate and outputs a relatively small value as a transcoding error increasing rate corresponding to the target coding unit when the average bit rate of the current frame is likely to be smaller than the target bit rate. That is, in the transcoding system 50, when the transcoding error increasing rate $\lambda$ is large, the optimum quantization step Qd becomes large and thereby the bit rate of the transcoded stream Vout decreases. On the other hand, when the transcoding error increasing rate $\lambda$ is small, the optimum quantization step Qd becomes small and thereby the bit rate of the transcoded stream Vout increases.

Further, the transcoding system 50 includes a quantization step derivation unit U75 instead of the quantization step derivation unit U74 of the transcoding system 40 according to the fourth embodiment. The quantization step derivation unit U75 selects one of the quantization steps Qa, Qb, and Qc as an optimum quantization step Qd for each coding unit, on the basis of the quantization step Qa, the simulation coding error Da, and the number of simulation-coded bits Ra which are output from the simulation encoder A, and the quantization step Qb, the simulation coding error Db, and the number of simulation-coded bits Rb which are output from the simulation encoder B, and the quantization step Qc, the simulation coding error Dc, and the number of simulation-coded bits Rc which are output from the simulation encoder C, and the transcoding error increasing rate $\lambda$ which is output from the rate distortion calculator U5.

Other constituents of the transcoding system 50 are identical to those of the transcoding system 40 according to the fourth embodiment.

Figure 16:
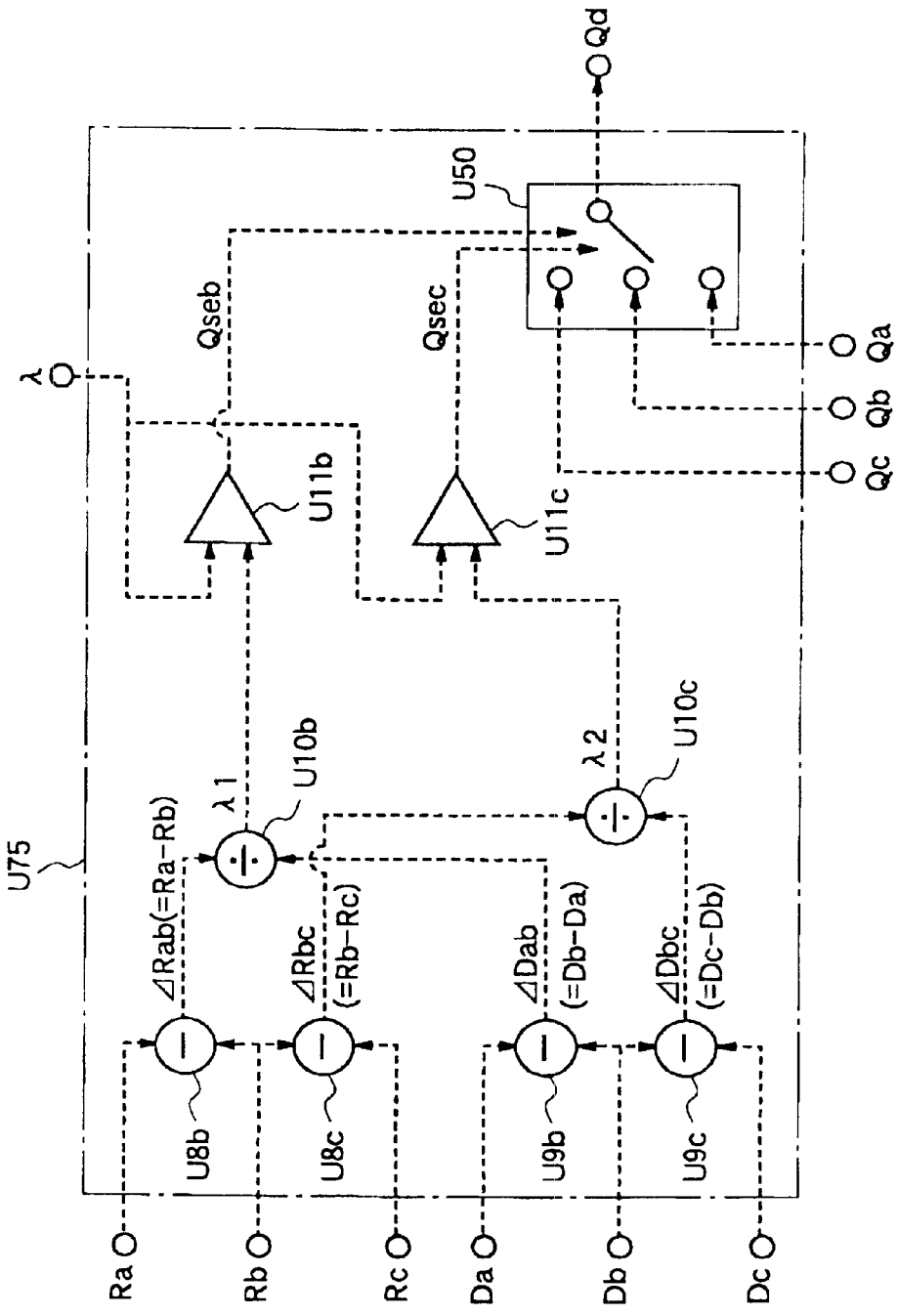
FIG. 16 is a block diagram for explaining a quantization step derivation unit which is a constituent of the transcoding system according to the fifth embodiment.

FIG. 16 is a block diagram illustrating the quantization step derivation unit U75 in more detail.

The quantization step derivation unit U75 includes a first number-of-bits subtracter U8*b* and a second number-of-bits subtracter U8*c*. The first number-of-bits subtracter U8*b* receives the number of first-simulation-coded bits Ra from the simulation encoder A and the number of second-simulation-coded bits Rb from the simulation encoder B, and calculates a difference $\Delta$Rab of these numbers (a variation in the number of simulation-coded bits). The second number-of-bits subtracter U8*c* receives the number of second-simulation-coded bits Rb from the simulation encoder B and the number of third-simulation-coded bits Rc from the simulation encoder C, and calculates a difference $\Delta$Rac of these numbers (a variation in the number of simulation-coded bits).

Further, the quantization step derivation unit U75 includes a first error subtracter U9*b* and a second error subtracter U9*c*. The first error subtracter U9*b* receives the simulation coding errors Da and Db from the simulation encoders A and B, and calculates a difference $\Delta$Dab of these errors (a variation in the simulation coding error). The second error subtracter U9*c* receives the simulation coding errors Db and Dc from the simulation encoders B and C, and calculates a difference $\Delta$Dbc of these errors (a variation in the simulation coding error).

Further, the quantization step derivation unit U75 includes a first divider U10*b* and a second divider U10*c*. The first divider U10*b* divides the variation in the simulation coding error $\Delta$Dab by the-variation in the number of simulation-coded bits $\Delta$Rab to obtain a first transcoding error increasing rate $\lambda$1 corresponding to each coding unit. The second divider U10*c* divides the variation in the simulation coding error $\Delta$Dbc by the variation in the number of simulation-coded bits $\Delta$Rbc to obtain a second transcoding error increasing rate $\lambda$2 corresponding to each coding unit.

Further, the quantization step derivation unit U75 includes a first comparator U11*b* and a second comparator U11*c*. The first comparator U11*b* compares the transcoding error increasing rate $\lambda$ in the current transcoding process supplied from the rate distortion calculator U5 with the first transcoding error increasing rate; $\lambda$1 supplied from the divider U10*b*, and outputs a first switch control signal Qseb according to the result of comparison. The second comparator U11*c* compares the transcoding error increasing rate $\lambda$ in the current transcoding process with the second transcoding error increasing rate $\lambda$2 supplied from the divider U10*c*, and outputs a second switch control signal Qsec according to the result of comparison.

Furthermore, the quantization step derivation unit U75 includes a selector switch U50 which selects one of the quantization steps Qa, Qb, and Qc which are supplied from the simulation encoders A, B, and C, respectively, on the basis of the first and second switch control signals Qseb and Qsec, and outputs the selected quantization step as an optimum quantization step Qd.

To be specific, in the quantization step derivation unit 75, when the transcoding error increasing rate $\lambda$ is equal to or smaller than the transcoding error increasing rate $\lambda$1, the switch U50 selects the quantization step Qa as an optimum quantization step Qd according to the switch control signal Qseb. When the transcoding error increasing rate $\lambda$ is larger than the transcoding error increasing rate $\lambda$1 and equal to or smaller than the transcoding error increasing rate $\lambda$2, the switch U50 selects the quantization step Qb as an optimum quantization step Qd according to the switch SCAM) control signals Qseb and Qsec. When the transcoding error increasing rate $\lambda$ is larger than the transcoding error increasing rate $\lambda$2, the switch U50 selects the quantization step Qc as an optimum quantization step Qd according to the switch control signal Qsec.

Next, the operation of the transcoding system 50 will be described.

When an input stream (coded stream) Vin is supplied to the transcoding system 50, this stream Vinc is decoded in the decoder U1, and the decoded stream Vdec is subjected to first and second simulation coding processes in the simulation encoders A and B, respectively.

At this time, in the simulation encoder C, the decoded stream Vdec is subjected to a third simulation coding process which is similar to the first and second simulation coding processes.

That is, in the simulation encoder C, the decoded stream Vdec of the current frame of being ark processed is subjected to the third simulation coding process including a quantization process using a quantization step Qc (Qc>Qb>Qa) and a local decoding process with reference to the reference image data Vc stored in the simulation memory C or the reference image data Vrefc stored in the main memory U3*d*. The quantization step Qc should not be smaller than the quantization step Qin used in the inverse quantization process. Then, the simulation encoder C outputs locally decoded image data Vstrc, the quantization step Qc corresponding to each coding unit, the number of simulation-coded bits Rc, and the simulating coding error Dc.

At this time, the locally decoded image data Vstrc is stored in the simulation memory C as image data of a frame which has already been processed. The image data stored in the simulation memory C is used as the above-described reference image data Vc when performing simulation coding on image data of an unprocessed frame.

In the quantization step derivation unit U75, an optimum quantization step Qd corresponding to each block (coding unit) is derived so that the transcoding error increasing rate corresponding to each block does not exceed the average transcoding error increasing rate (target transcoding error increasing rate) $\lambda$ corresponding to the target frame, on the basis of the quantization steps Qa, Qb and Qc, the numbers of simulation-coded bits Ra, Rb and Rc, and the simulation coding errors Da, Db and Dc, which are supplied from the simulation encoders A, B, and C, respectively.

In the main encoder U2d, as in the fourth embodiment, the decoded image data Vdec is subjected to a transcoding process which includes a quantization process using the optimum quantization step Qd and a local decoding process with reference to the reference image data Vrefd stored in the main memory U3d. Thereby, a transcoded stream Vout and locally decoded image data Vstrd are output from the main encoder U2d.

In the rate distortion calculator U5, on the basis of the transcoded stream Vout corresponding to each frame, a relatively large value is output as a transcoding error increasing rate $\lambda$ when the average bit rate of the frame being coded is likely to be larger than the target frame bit rate, and a relatively small value is output as a transcoding error increasing rate $\lambda$ when the average bit rate of the frame being coded is likely to be smaller then the target frame bit rate.

Hereinafter, the operation of the quantization step derivation unit U75 will be described in more detail.

Initially, the first number-of-bits subtracter U8b performs subtraction to obtain a variation in the number of simulation-coded bits $\Delta Rab$, the first error subtracter U9b performs;-subtraction to obtain a variation in the simulation coding error $\Delta Dab$, and the first divider U10b performs arithmetic to obtain a transcoding error increasing rate $\lambda 1$. Further, the second number-of-bits subtracter U8c performs subtraction to obtain a variation in the number of simulation-coded bits $\Delta Rbc$, the second error subtracter U9c performs subtraction to obtain a variation in the simulation coding error $\Delta Dbc$, and the second divider U10c performs arithmetic to obtain a transcoding error increasing rate $\lambda 2$.

The processes in the first number-of-bits subtracter U8b, the first error subtracter U9b, and the first divider U10b are identical to those already described for the fourth embodiment, and the processes in the second number-of-bit subtracter U8c, the second error subtracter U9c, and the second divider U10c are identical to those performed by the subtracter U8b, the subtracter U9b, and the divider U10b.

To be specific, in the second number-of-bits subtracter U8c, the number of third-simulation-coded bits Rc is subtracted from the number of second-simulation-coded bits Rb to obtain a difference $\Delta Rbc$ of these numbers (a variation in the number of simulation-coded bits). In the second error subtracter U9c, the simulation coding error Db supplied from the simulation encoder B is subtracted from the simulation coding error Dc supplied from the simulation encoder C to obtain a difference $\Delta Dbc$ of these errors (a variation in the simulation coding error). Further, in the second divider U10c, the variation in the simulation coding error $\Delta Dbc$ is divided by the variation in the number of simulation-coded bits $\Delta Rbc$ to derive the second transcoding error increasing rate $\lambda 2$.

Further, in the first comparator U11b, the first transcoding error increasing rate $\lambda 1$ supplied from the divider U10b is compared with the transcoding error increasing rate $\lambda$ of the current transcoding process, and a first control signal Qseb according to the result of comparison is output. In the second comparator U11c, the second transcoding error increasing rate $\lambda 2$ supplied from the divider U10c is compared with the transcoding error increasing rate $\lambda$ in the current transcoding process, and a second switch control signal Qsec according to the result of comparison is output.

Then, in the selector switch U50, one of the quantization steps Qa, Qb, and Qc supplied from the simulation encoders A, B, and C is selected on the basis of the first and second switch control signals Qseb and Qsec, and the selected quantization step is output as an optimum quantization step Qd.

To be specific, when the transcoding error increasing rate $\lambda$ is equal to or smaller than the transcoding error increasing rate $\lambda 1$, the switch U50 selects the quantization step Qa as an optimum quantization step Qd, according to the switch control signal Qseb. When the transcoding error increasing rate $\lambda 1$ is larger than the transcoding error increasing rate $\lambda 1$ and equal to or smaller than the transcoding error increasing rate $\lambda 2$, the switch U50 selects the quantization step Qb as an optimum quantization step Qd, according to the switch control signals Qseb and Qsec. When the transcoding error increasing rate $\lambda$ is larger than the transcoding error increasing rate $\lambda 2$, the switch U50 selects the quantization step Qc as an optimum quantization step Qd, according to the switch control signal Qsec.

As described above, the transcoding system of this fifth embodiment is provided with the rate distortion calculator U5 which compares the bit rate of the transcoded stream Vout (the current bit rate) from the main encoder U2d with the target bit rate Rate supplied from the outside, and calculates an average transcoding error increasing rate $\lambda$ which becomes an index of image quality of the target frame, according to the result of comparison. When the first and second transcoding error increasing rates $\lambda 1$ and $\lambda 2$ ($\lambda 1 < \lambda 2$) corresponding to each coding unit (block), which are obtained from the results of the coding processes in the simulation encoders A, B, and C having different quantization steps Qa, Qb, and Qc (Qa<Qb<Qc), are smaller than the average transcoding error increasing rate $\lambda$, the quantization steps Qb and Qc are used as the optimum quantization step Qd for this block, respectively, whereby the bit rate is reduced while minimizing degradation of image quality.

In this fifth embodiment, the transcoding system 50 includes three simulation encoders, and the first and second transcoding error increasing rates $\lambda 1$ and $\lambda 2$ are compared with the average transcoding increasing rate $\lambda$ corresponding to one frame to decide the optimum quantization step Qd for each block. However, the number of simulation encoders is not restricted to three, and it may be two as in the fourth embodiment, or more than three.

For example, it is assumed that the transcoding system 50 includes two simulation encoders A and B. In this case, when the first transcoding error increasing rate $\lambda 1$ corresponding to each block, which is obtained from the results of the coding processes in the simulation encoders A and B having different quantization steps Qa and Qb (Qa<Qb), is smaller than the average transcoding error increasing rate $\lambda$ corresponding to one frame, the quantization step derivation unit U75 selects the larger quantization step Qb as an optimum quantization step Qd for this block. When the first transcoding error increasing rate $\lambda 1$ is not smaller than the average transcoding error increasing rate $\lambda$, the quantization step derivation unit U75 selects the smaller quantization step Qa.

Embodiment 6

Figure 17:
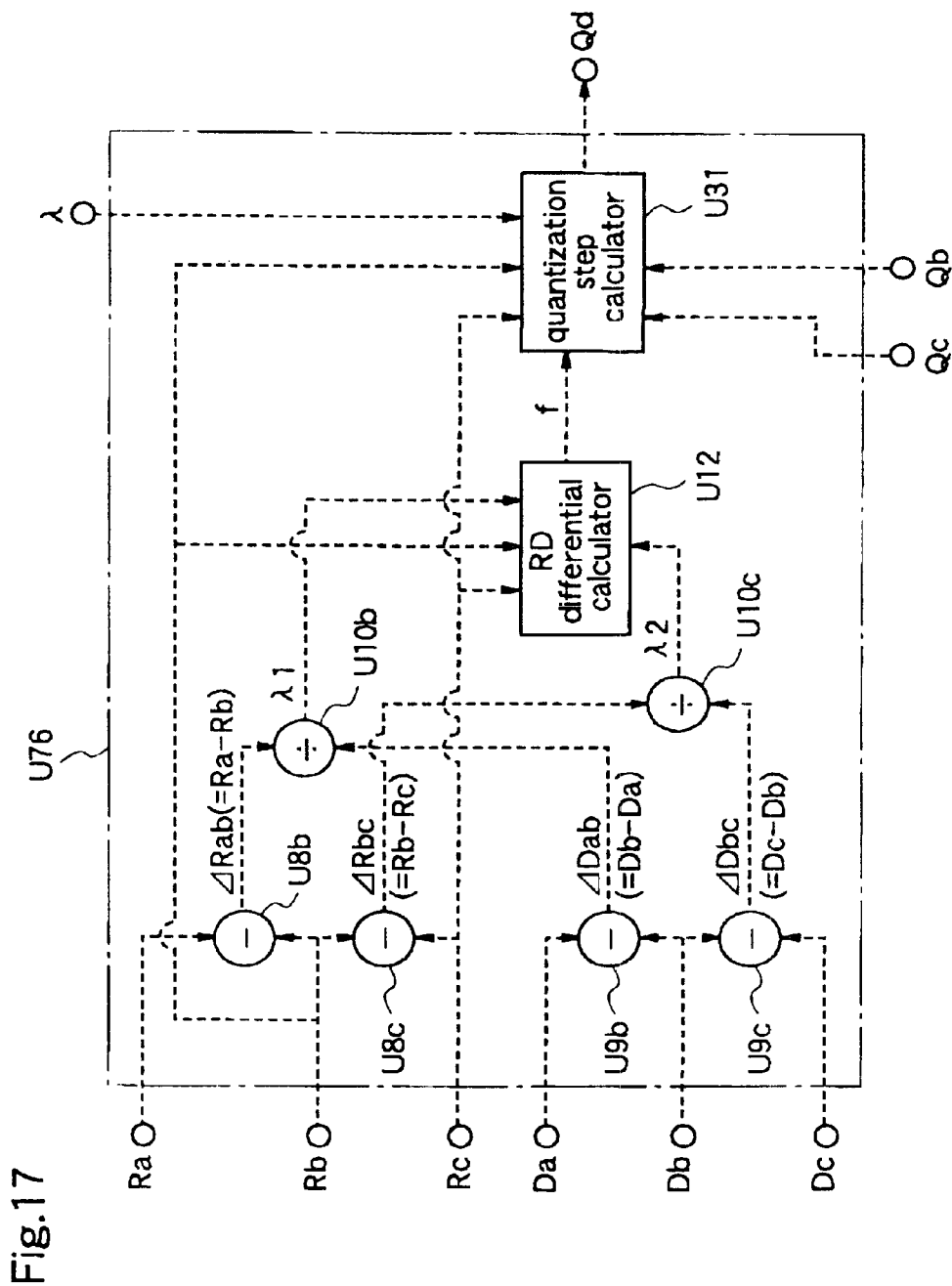
FIG. 17 is a block diagram for explaining a transcoding system according to a sixth embodiment of the present invention, illustrating a quantization step derivation unit included in the transcoding system.

FIG. 17 is a block diagram for explaining a transcoding system according to a sixth embodiment of the present invention, illustrating a quantization step derivation unit included in this transcoding system.

The transcoding system of this sixth embodiment has a quantization step derivation unit U76 instead of the quantization step derivation unit U75 according to the fifth embodiment. The quantization step derivation unit U76 obtains the relational expression between the transcoding error increasing rate $\lambda$ and the quantization step Q on the basis of the quantization steps Qa, Qb, and Qc, the numbers of simulation-coded bits Ra, Rb, and Rc, and the simulation coding errors Da, Db, and Dc, which are obtained as the results of simulation coding processes in the respective simulation encoders, and then obtains the optimum quantization step Qd for each coding unit on the basis of the relational expression and the target coding error increasing rate λ supplied from the rate distortion calculator U5. Other constituents of the transcoding system according to this sixth embodiment are identical to those of the transcoding system according to the fifth embodiment.

Hereinafter, the quantization step derivation unit U76 will be described in more detail by using FIG. 17.

The quantization step derivation unit U76 includes an RD differential calculator U12 and a quantization step calculator U31 instead of the first and second comparators U11$b$ and U11$c$ and the switch U50 included in the quantization step derivation unit 75 of the fifth embodiment. The RD differential calculator U12 derives an RD differential function f indicating the relationship between the target transcoding error increasing rate λ and the bit rate R. By using the RD differential function f, the quantization step calculator U31 calculates an optimum quantization step corresponding to the transcoding error increasing rate λ, for each coding unit, from the relationship between the quantization step Q and the number of transcoded bits R (i.e., the number of bits corresponding to each coding unit which is obtained by coding the decoded stream Vdec). The bit rate is equivalent to the number of bits corresponding to each coding unit.

Hereinafter, the RD differential calculator U12 and the quantization step calculator U31 will be described in more detail.

Generally, a function represented by the following formula (6) (rate-error function) is realized between the number of coded bits R in each block (coding unit) and the coding error D of each block.

Thus, in the transcoding process, the coding error D including in the transcoded stream is represented by $$\Delta D + Din = g(R) \tag{7}$$

where ΔD is the transcoding error (coding error increased in the transcoding process), and Din is the coding error of the input stream Vin.

Accordingly, the transcoding error increasing rate λ is represented by $$\lambda = \partial D/\partial R = \partial \Delta D/\partial R = \partial g(R)/\partial R \tag{8}$$

It is known that the function g(R) can be approximated as follows.

$$g(R) = A \cdot R^B \tag{9}$$

wherein A and B are constants.

Accordingly, from formulae (8) and (9), the transcoding error increasing rate λ is represented as follows.

$$\lambda = A \cdot R^{B-1} \tag{10}$$

Assuming that the transcoding error increasing rate λ1 is a transcoding error increasing rate λ when R=Rb and the transcoding error increasing rate λ2 is a transcoding error increasing rate λ when R=Rc, the constants A and B are obtained from formula (10). As the result, an RD differential function f represented as follows is derived.

$$R = f(\lambda) \tag{11}$$

The RD differential calculator U12 performs an arithmetic for deriving the function f represented by formula (11), on the basis of the bit rates Rb and Rc of the transcoded streams supplied from the simulation encoders B and C, and the transcoding error increasing rates λ1 and λ2 supplied from the dividers U10$b$ and U10$c$.

On the other hand, the quantization step Q and the bit rate R have the relationship represented by $$R = \alpha \cdot Q^\beta \tag{12}$$

wherein α and β are constants, and α and β are obtained by assigning the bit rates Rb and Rc and the quantization steps Qb and Qc. As the result, a function h represented by the following formula (13) is derived.

$$R = h(Q) \tag{13}$$

Accordingly, from formulae (11) and (13), a function s indicating the relationship between the transcoding error increasing rate λ and the quantization step Q is obtained as follows.

$$Q = s(\lambda) \tag{14}$$

In other words, the quantization step corresponding to the transcoding error increasing rate λ can be derived as the optimum quantization step Qd by using formula (14).

The quantization step calculator U31 performs an arithmetic to derive the function h represented by formula (13) on the basis of the number of simulation-coded bits Rb supplied from the simulation encoder B, the quantization step Qb used in the second simulation coding process, the number of simulation-coded bits Rc supplied from the simulation encoder C, and the quantization step Qc used in the third simulation coding process. Further, the calculator U31 derives the function s from the function h and the function f which is obtained by the RD differential calculator U12 and, furthermore, it derives, from this function s, a quantization step corresponding to the target transcoding error increasing rate λ which is obtained by the rate distortion calculator U5, as an optimum quantization step Qd.

Next, the operation of the transcoding system according to this sixth embodiment will be described.

The operation of the transcoding system according to this sixth embodiment is identical to that of the transcoding system 50 according to the fifth embodiment, except the operation of the quantization step derivation unit U76.

As a result, only the operation of the quantization step derivation unit U76 will be described hereinafter.

In this sixth embodiment, initially, the first number-of-bits subtracter U8$b$ performs subtraction to obtain a variation in the number of simulation-coded-bits ΔRab, the first error subtracter U9$b$ performs subtraction to obtain a variation in the simulation coding error ΔDab, and the first divider U10$b$ performs arithmetic to obtain the transcoding error increasing rate λ1. Further, the second number-of-bits subtracter U8$c$ performs subtraction to obtain a variation in the number of simulation-coded bits ΔRbc, the second error subtracter U9$c$ performs subtraction to obtain a variation in the simulation coding error ΔDbc, and the second divider U10$c$ performs arithmetic to obtain a transcoding error increasing rate λ2.

In the RD differential calculator U12, the function f (R=f(λ)) represented by formula (11) is derived on the basis of the numbers of simulation-coded bits Rb and Rc obtained in the simulation encoders B and C, and the transcoding error increasing rates λ1 and λ2 supplied from the first and second dividers U10$b$ and U10$c$.

Further, in the quantization step calculator U31, the function h (R=h(Q)) represented by formula (13) is derived on the basis of the number of simulation-coded bits Rb supplied from the simulation encoder B, the quantization step Qb used in the second simulation coding process, the number of simulation-coded bits Rc supplied from the simulation encoder C, and the quantization step Qc used in the third simulation coding process. Further, the function s (Q=s($\lambda$)) represented by formula (14) is obtained from the function h and the function f which is obtained by the RD differential calculator U12. Further, by using this function s, a quantization step corresponding to the target transcoding error increasing rate $\lambda$ which is obtained by the rate distortion calculator U5, is obtained as an optimum quantization step Qd.

As described above, in the transcoding system according to this sixth embodiment, the quantization step derivation unit U76 is provided with the RD differential calculator U12 which derives the function f (R=f($\lambda$)) indicating the relationship between the transcoding error increasing rate $\lambda$ and the bit rate on the basis of the result of simulation coding; and the quantization step calculator U31 which obtains the function s (Q=s($\lambda$)) indicating the relationship between the transcoding error increasing rate $\lambda$ and the quantization step, on the basis of the function f and the result of simulation coding, and then derives a quantization step corresponding to the target transcoding error increasing rate $\lambda$ obtained in the rate distortion calculator U5, as an optimum quantization step Qd for each coding unit, by using the function s. Therefore, the optimum quantization step Qd corresponding to each coding unit can be set more minutely.

In this sixth embodiment, the RD differential function f is derived on the basis of a difference between the simulation coding errors Db and Da, a difference between the numbers of simulation-coded bits Ra and Rb, a difference between the simulation coding errors Db and Dc and a difference between the numbers of simulation-coded bits Rb and Rc. However, a difference between the simulation coding errors Dc and Da may be used as the above-mentioned difference between the simulation coding errors. Further, a difference between the numbers of simulation-coded bits Ra and Rc may be used as the difference between the numbers of simulation-coded bits for each coding unit (block).

Embodiment 7

Figure 18:
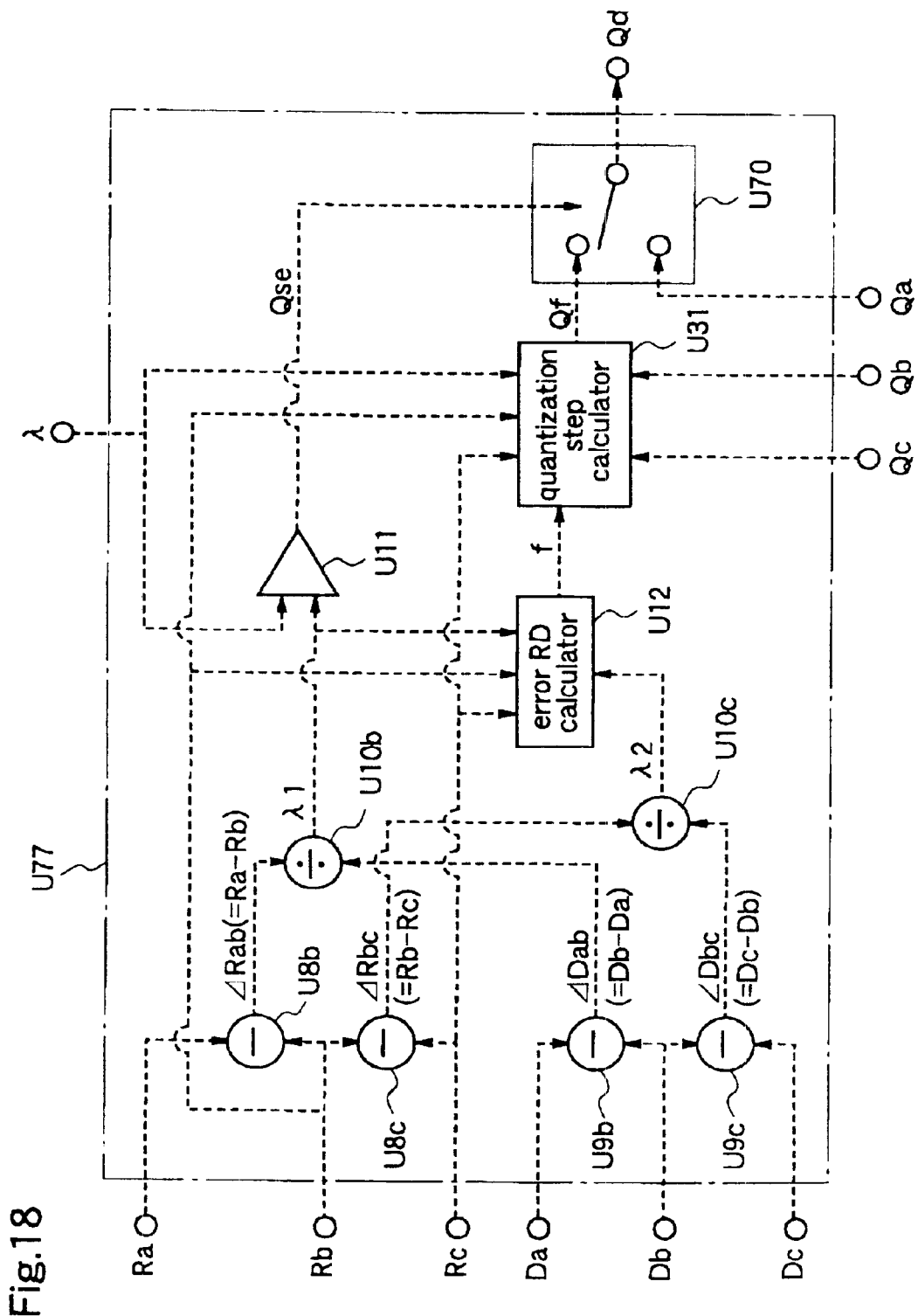
FIG. 18 is a block diagram for explaining a transcoding system according to a seventh embodiment of the present invention, illustrating a quantization step derivation unit included in the transcoding system.
Figure 19:
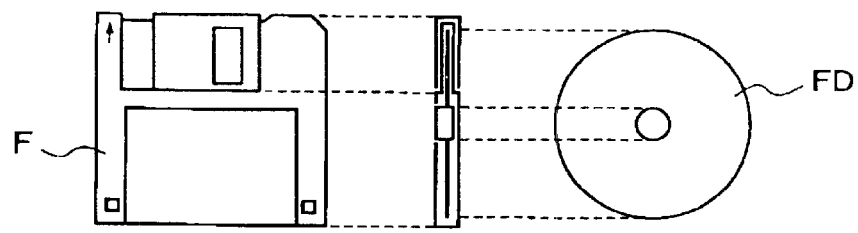
FIGS. 19(a) and 19(b) are diagrams for explaining a data storage medium which contains a program for performing, with a computer system, a transcoding process by any of the transcoding systems according to the first to seventh embodiments.
FIG. 19(c) is a diagram illustrating the computer system.
Figure 19:
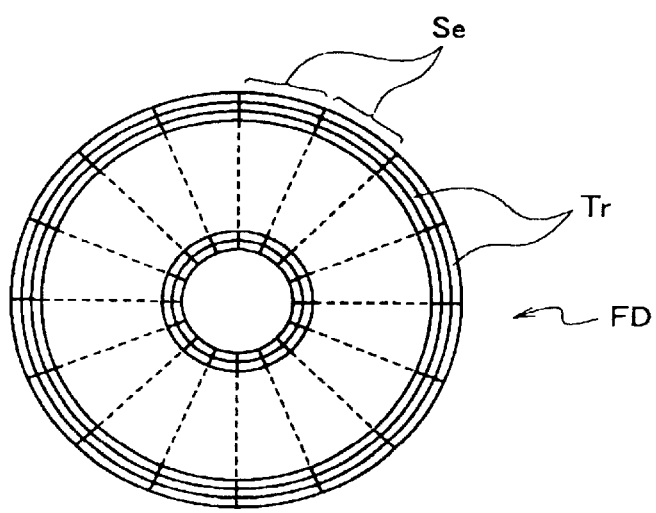
Figure 19:
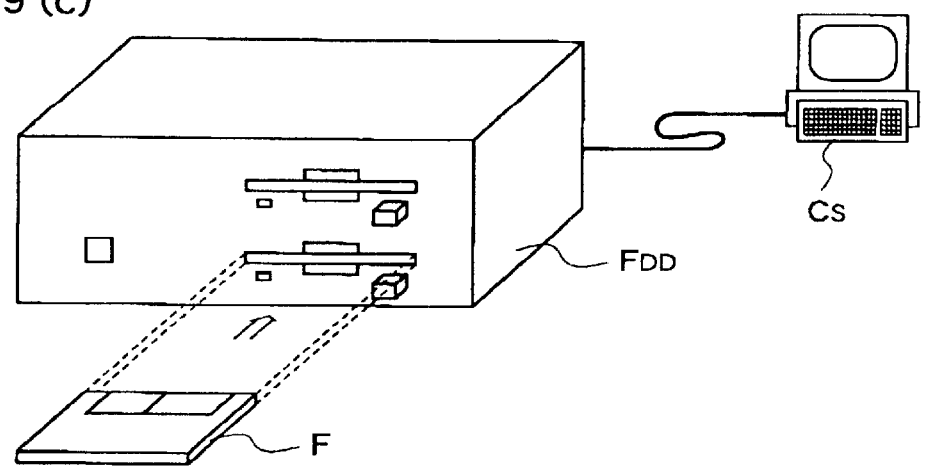
Figure 20:
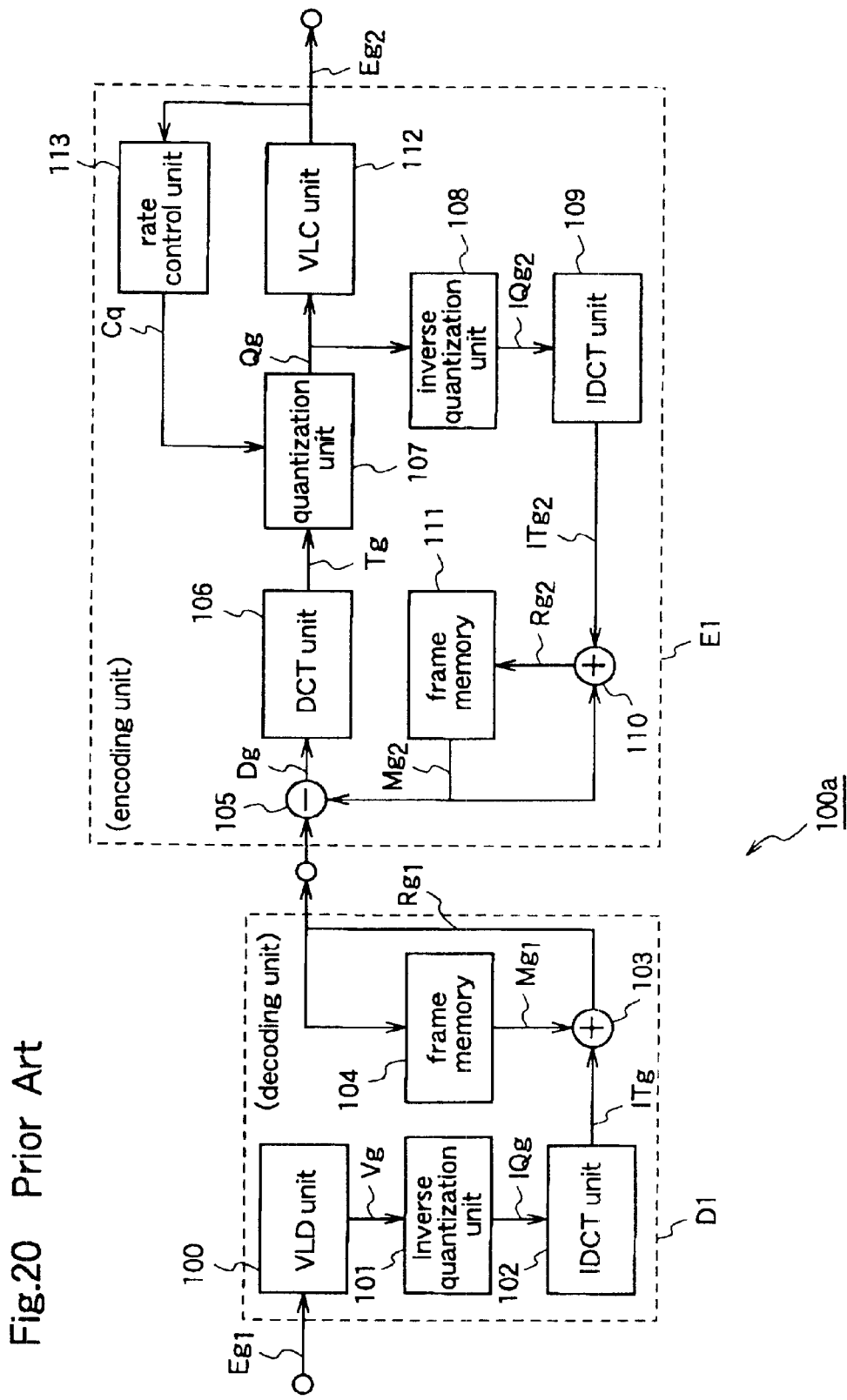
FIG. 20 is a block diagram for explaining a transcoding system according to the prior art.
Figure 21:
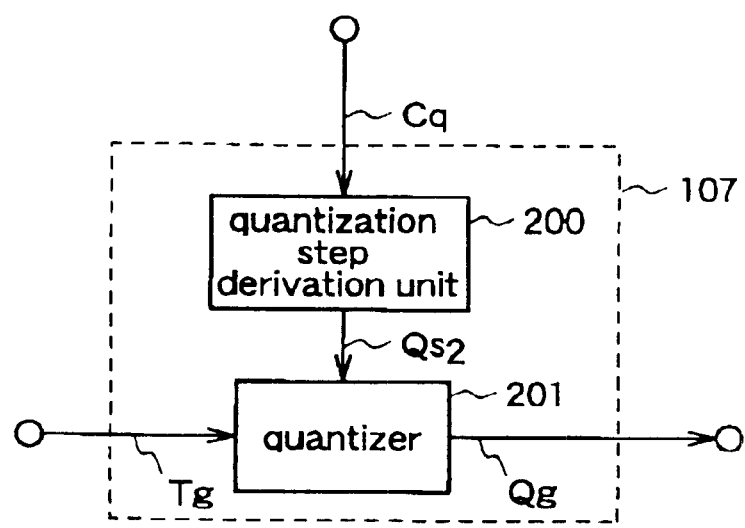
FIG. 21 is a block diagram for explaining a quantization unit which is a constituent of the transcoding system according to the prior art.
Figure 22:
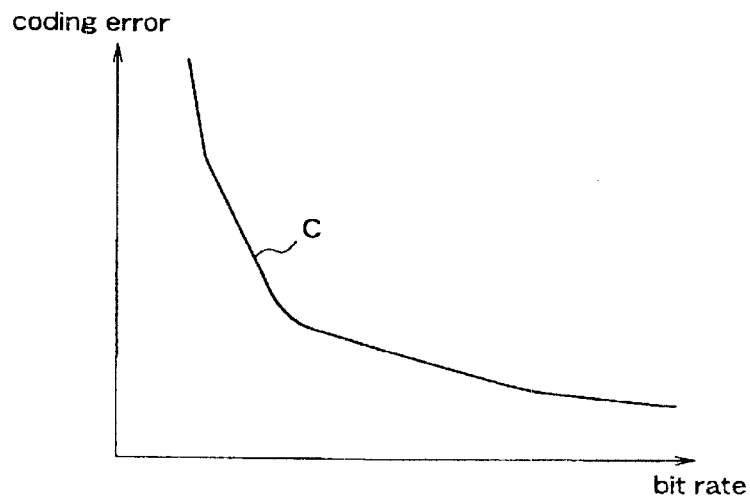
FIG. 22 is a graph illustrating the relationship between bit rate of a coded stream and coding error included in the coded stream.

FIG. 18 is a block diagram for explaining a transcoding system according to a seventh embodiment of the present invention, illustrating a quantization step derivation unit included in the transcoding system.

The transcoding system of this seventh embodiment includes a quantization step derivation unit U77 instead of the quantization step derivation unit U76 according to the sixth embodiment. The quantization step derivation unit U77 selects either a quantization step Qf which is output from the quantization step calculator U31 or the smallest quantization step Qa among the quantization steps Qa, Qb, and Qc, according to the transcoding error increasing rate $\lambda 1$, and outputs the selected quantization step as an optimum quantization step Qd.

Hereinafter, the quantization step derivation unit U77 will be described in more detail by using FIG. 18.

The quantization step derivation unit U77 includes a comparator U11 and a selector switch U70, in addition to the constituents of the quantization step derivation unit U76 according to the sixth embodiment. The comparator U11 compares the first transcoding error increasing rate $\lambda 1$ supplied from the first divider U10b with the target transcoding error increasing rate $\lambda$ supplied from the rate distortion calculator U5, and outputs a switch control signal Qse. The selector switch U70 selects either the quantization step Qf output from the quantization step calculator U31 or the smallest quantization step Qa, according to the switch control signal Qse, and outputs the selected quantization step and an optimum quantization step Qd.

Hereinafter, the comparator U11 will be described more specifically.

Generally, in the transcoding system, when a difference between the size of the quantization step Qin used in the coding process for the input stream Vin and the size of the quantization step Qd used in the transcoding process is large (i.e., when the transcoding error increasing rate is large), the transcoding error increasing rate $\lambda$ increases monotonously as the quantization step Qd increases. On the other hand, when the difference between the size of the quantization step Qin used in the coding process for the input stream Vin and the size of the quantization step Qd used in the transcoding process is small (i.e., when the transcoding error increasing is small), the transcoding error increasing rate $\lambda$ does not necessarily increase even when the quantization step Qd increases, and it may decrease according to the circumstances. This has already been described for the second embodiment of the invention by using FIG. 7, and is described in more detail in "Study on Transcoding Error in MPEG2 Transcoding", IE99-32, The Institute of Electronics, Information and Communication Engineers.

That is, in FIG. 7, the quantization error in the transcoded data is large when its bit rate is high (i.e., when a difference between the quantization step value QPi used in the first quantization process (quantization process in the coding process) and the quantization step value QPr used in the second quantization process (quantization process in the transcoding process) is small). On the other hand, when the quantization step value QPr in the second quantization process is equal to or larger than 2QP (QPi=QP) and the bit rate of the transcoded data is low, there is little difference between the quantization error in the direct coding process and the quantization error in the transcoding process. The increase or decrease in the quantization error in the transcoded data corresponds to the increase or decrease in the transcoding error increasing rate.

The comparator U11 controls the selector switch U70 so that the switch U70 selects the smallest quantization step Qa amongst the quantization steps, Qa, Qb, and Qc (Qa<Qb<Qc) used in the first, second, and third simulation coding processes, when the transcoding error increasing rate $\lambda 1$ of each coding unit (target block) which is obtained in the simulation coding process is smaller than the target transcoding error increasing rate $\lambda$ of the target frame, and selects the quantization step Qf from the quantization step calculator U31 when the transcoding error increasing rate $\lambda 1$ is equal to or larger than the transcoding error increasing rate $\lambda$.

In other words, this seventh embodiment is obtained by combining the transcoding system of the sixth embodiment and the transcoding system of the second embodiment. To be specific, the comparator U11 and the selector switch U70 included in the quantization step derivation unit U77 of this seventh embodiment correspond to the quantization step derivation unit 252 included in the quantization unit 152 of the second embodiment, and part of the derivation unit U77 other than the comparator U11 and the selector switch U70 corresponds to the candidate quantization step derivation unit 250.

In the quantization step derivation unit U77 of this seventh embodiment, the transcoding error increasing rate λ1 obtained in the simulation coding process is compared with the target transcoding error increasing rate λ of the target frame. When λ1<λ, the smallest quantization step Qa in the simulation coding process is selected, and when λ1≧λ, the quantization step Qf from the quantization step calculator U31 is selected. This quantization step derivation process is identical to the process described for the second embodiment in which the candidate quantization step Qsb is compared with the threshold. Qth (=n×Qs1) and the constant multiple Qmu (=m×Qs1>Qth) and either the first quantization step Qs1 or the constant multiple Qmu is selected as a quantization step when Qsb<Qmu, and the candidate quantization step Qsb is selected when Qmu≦Qsb.

Next, the operation of the transcoding system will be described.

The operation of the transcoding system of this seventh embodiment is identical to that of the transcoding system 50 of the fifth embodiment except the operation of the quantization step derivation unit U77.

Therefore, only the operation of the quantization step derivation unit U77 will be described hereinafter.

In this seventh embodiment, the subtracters U8b and U8c, the subtracters U9b and U9c, the dividers U10b and U10c, the RD differential calculator U12, and the quantization step calculator U31 perform the same arithmetic processing as that described for the sixth embodiment. Thereby, first and second transcoding error increasing rates λ1 and λ2 corresponding to each coding unit (target block) are output from the dividers U10b and U1c, respectively. Further, an RD differential function f is derived from the RD differential calculator U12, and a value Qf corresponding to the target coding error increasing rate λ is output as a quantization step for the target block from the quantization step calculator U31.

In the comparator U11, the first transcoding error increasing rate λ1 corresponding to the target block is compared with the target transcoding error increasing rate λ corresponding to the target frame, and a switch control signal Qse is output to the selector switch U70 according to the result of comparison. In the selector switch U70, according to the switch control signal Qse, either the quantization step Qf from the quantization step calculator U31 or the quantization step Qa used in the first simulation coding process is selected and output as an optimum quantization step Qd.

To be specific, when the first transcoding error increasing rate λ1 corresponding to the target block is smaller than the target transcoding error increasing rate λ corresponding to the target frame, the selector switch U70 selects the quantization step Qa as an optimum quantization step Qd according to the switch control signal Qse. On the other hand, when the first transcoding error increasing rate λ1 is not smaller than the target transcoding error increasing rate λ, the selector switch U70 selects the quantization step Qf from the quantization step calculator U31 as an optimum quantization step Qd.

As described above, in the transcoding system of this seventh embodiment, the quantization step derivation unit U77 includes, in addition to the constituents of the quantization step derivation unit U76 of the sixth embodiment, the comparator U11 which compares the transcoding error increasing rate λ1 from the divider U10b with the target transcoding error increasing rate λ from the rate distortion calculator, and outputs a switch control signal Qse according to the result of comparison. Only when the transcoding error increasing rate λ1 is smaller than the target transcoding error increasing rate λ, the smallest quantization step Qa in the simulation coding process is selected as a quantization step for the target block, instead of the quantization step Qf obtained by the quantization step calculator U31. Therefore, when variation in the transcoding error increasing rate with increase in the quantization step is not monotonous increase and the transcoding error increasing rate has a value within a range in which the quantization step calculator U31 cannot easily derive an optimum quantization step Qd with which the transcoding error is minimized, the smallest quantization step Qa used in the simulation coding process is always used as an optimum quantization step for the target block.

Therefore, when the target transcoding error increasing rate λ of the target frame has a value within a range in which the difference between the quantization step Qin of the input stream Vin and the quantization step Qd in the transcoding process for the input stream Vin becomes small, the operation of the transcoding system is prevented from being unstable. Further, when the target transcoding error increasing rate λ of the target frame is outside the range, the quantization step Qf derived from the quantization step calculator U31 is used as the quantization step Qd, whereby the transcoding error is minimized.

In the sixth and seventh embodiments of the present invention, the RD differential function f shown in formula (11) is used as a function indicating the relationship between the number R of coded bits per coding unit of the transcoded stream and the transcoding error increasing rate λ. However, a function indicating this relationship is not restricted thereto.

For example, when another RD differential function having a similar tendency and characteristic to those of the RD differential function f can be derived from the simulation coding errors Da, Db, and Dc and the numbers of simulation-coded bits Ra, Rb, and Rc, this RD differential function may be used as a function indicating the relationship between the number of coded bits R and the transcoding error increasing rate λ.

Further, in the fifth to seventh embodiments, the transcoding system includes the simulation encoders A, B, and C which perform simulation transcoding including quantization on only a frame to be transcoded in the main encoder U2d. However, the structure of the transcoding system is not restricted thereto.

For example, as described for the fourth embodiment, when the transcoding system performs inter-frame predictive coding based on MPEG, the simulation encoders A, B, and C may perform simulation coding not only on the target frame to be subjected to transcoding in the main encoder U2d but also on other frames which use this target frame as a reference frame when being subjected to transcoding.

When a program for executing, by using software, a transcoding process of any of the above-described transcoding systems according to the first to seventh embodiments, is recorded in a data storage medium such as a floppy disk, the transcoding process can be easily realized in an independent computer system.

FIGS. 19(a)–19(c) are diagrams illustrating a data storage medium (FIGS. 19(a) and 19(b)) which contains a program for performing the transcoding process according to any of the aforementioned embodiments by using a computer system, and the computer system (FIG. 19(c)).

FIG. 19(a) shows a front view of a floppy disk, a cross-sectional view thereof, and a floppy disk body (storage medium body) FD. FIG. 19(b) shows an example of a physical format of the floppy disk FD.

The floppy disk FD is contained in a floppy disk case F. On the surface of the floppy disk FD, a plurality of tracks Tr are formed concentrically from the outer circumference of the disk toward the inner circumference. Each track Tr is divided into 16 sectors (Se) in the angular direction. Therefore, in the floppy disk FD containing the above-mentioned program, the program is recorded in the assigned sectors (Se) on the floppy disk FD.

FIG. 19(c) shows the structure for recording and playback of the program in/from the floppy disk FD. When the program is recorded in the floppy disk FD, data as the program is read from a computer system Cs and written in the floppy disk FD through a floppy disk drive FDD. When the transcoding system according to any of the aforementioned embodiments is constructed in the computer system Cs according to the program recorded in the floppy disk FD, the program is read from the floppy disk FD by using the floppy disk drive FDD and then loaded to the computer system Cs.

Although in the above description a floppy disk is employed as a data storage medium, even when an optical disk is employed, the transcoding process by software can be performed in the same manner as described for the floppy disk. Further, the data storage medium is not restricted to the floppy disk and the optical disk, other media may be employed as long as the program can be recorded therein. For example, an IC card or a ROM cassette may be employed. Also when using these data storage media, the transcoding process using software can be performed in the same manner as described for the floppy disk.

What is claimed is:

1. A coded data transform method including a decoding process for decoding first coded data which has been obtained by subjected image data, for each coding unit, to a coding process including a first orthogonal transform process and a first quantization process to generate decoded data, and a transcoding process for coding the decoded data, for each coding unit, to generate second coded data, wherein:

said decoding process comprises:
an inverse quantization process for inversely quantizing quantized coefficients obtained from the first coded data by using a first quantization step which has been used in the first quantization process; and
said transcoding process comprises:
a second orthogonal transform process for subjecting the decoded data to orthogonal transform to generate frequency-domain data; and
a second quantization process for deriving a second quantization step on the basis of the second coded data and the first quantization step, and quantizing the frequency-domain data with the second quantization step.

2. The coded data transform method of claim 1, wherein said second quantization process further comprises:
a candidate derivation process for deriving a candidate quantization step on the basis of the second coded data; and
a quantization step derivation process for deriving the second quantization step on the basis of the candidate quantization step and the first quantization step.

3. The coded data transform method of claim 2, wherein in said quantization step derivation process:
when the candidate quantization step has a value which is equal to or larger than the value of the first quantization step and smaller than twice the value of the first quantization step, a quantization step having the same value as that of the first quantization step or a quantization step having a value equal to or larger than twice the value of the first quantization step is derived as the second quantization step; and
when the candidate quantization step has a value outside the above-described range, the candidate quantization step is derived as the second quantization step.

4. The coded data transform method of claim 1, wherein:
said coding process includes a first intra-frame coding process utilizing the correlation of pixel values in a frame and a first inter-frame coding process utilizing the correlation of pixel values between frames, wherein said first intra-frame coding process includes a first intra-frame quantization process while said first inter-frame coding process includes a first inter-frame quantization process;
said transcoding process includes a second intra-frame coding process utilizing the correlation of pixel values in a frame and a second inter-frame coding process utilizing the correlation of pixel values between frames, wherein said second intra-frame coding process includes a second intra-frame quantization process while said second inter-frame coding process includes a second inter-frame quantization process;
said decoding process includes an intra-frame decoding process adapted to the intra-frame coding process and an inter-frame decoding process adapted to the inter-frame coding process, wherein said intra-frame decoding process includes an intra-frame inverse quantization process while said inter-frame decoding process includes an inter-frame inverse quantization process; and
said second quantization process includes:
an average quantization step derivation process for deriving the average of quantization steps of all coding units in the first intra-frame quantization process as a first intra-frame average quantization step, deriving the average of quantization steps of all coding units in the second intra-frame quantization process as a second intra-frame average quantization step, deriving the average of quantization steps of all coding units in the first inter-frame quantization process as a first inter-frame quantization step, and deriving the average of quantization steps of all coding units in the second inter-frame quantization process as a second inter-frame quantization step; and
a quantization step derivation process for deriving the second quantization step on the basis of these average quantization steps and the transcoded data.

5. The coded data transform method of claim 4, wherein, in said second quantization step derivation process, the second quantization step is derived so that the ratio of the second intra-frame average quantization step to the first intra-frame average quantization step is smaller than the ratio of the second inter-frame average quantization step to the first inter-frame average quantization step.

6. A transcoding system comprising a decoding unit for receiving coded data which has been obtained by subjecting image data of each coding unit to a coding process including a first orthogonal transform process and a first quantization process, and decoding the input coded data for each coding unit to generate decoded data, and an encoding unit for coding the decoded data to generate transcoded data, wherein:

said decoding unit comprises:
an inverse quantizer for inversely quantizing quantized coefficients obtained from the input coded data with a first quantization step which has been used in the first quantization process; and said encoding unit comprises:
   a frequency transform unit for subjecting the decoded data to a second orthogonal transform process to generate frequency-domain data; and
   a quantization means for subjecting the frequency-domain data to a second quantization process with a second quantization step which is derived on the basis of the transcoded data and the first quantization step.

7. The transcoding system of claim 6, wherein:

said inverse quantizer performs inverse quantization corresponding to either intra-frame quantization or inter-frame quantization according to whether the coding process performed on the input coded data is either intra-frame coding or inter-frame coding, respectively; and said quantization means comprises:
   a first step derivation unit for averaging the quantization steps of all coding units in the inverse quantization process corresponding to the intra-frame quantization process on the basis of the first quantization step supplied from said inverse quantizer, thereby deriving an intra-frame average quantization step;
   a second step derivation unit for averaging the quantization steps of all coding units in the inverse quantization process corresponding to the inter-frame quantization on the basis of the first quantization step supplied from the inverse quantizer, thereby deriving an inter-frame average quantization step; and
   a quantization step derivation unit for deriving a second quantization step on the basis of the transcoded data, the intra-frame average quantization step, and the inter-frame average quantization step; and said quantization means quantizes the frequency-domain data with the second quantization step.

8. A data storage medium containing a data transform program for making a computer perform the coded data transform method of claim 1.

9. A coded data transform method comprising:

decoding first coded data obtained by subjecting image data, for each coding unit, to coding which includes a first orthogonal transform and a first quantization to generate decoded data; and transcoding by coding the decoded data, for each coding unit, to generate second coded data;

wherein said decoding comprises:
   inverse quantizing quantized coefficients obtained from the first coded data by using a first quantization step which has been used in the first quantization;

wherein said transcoding comprises:
   subjecting the decoded data to orthogonal transform to generate frequency-domain data; and
   deriving a second quantization step on the basis of the second coded data and the first quantization step, and quantizing the frequency-domain data with the second quantization step.

10. A coded data transform method as claimed in claim 9, wherein said deriving a second quantization step further comprises:

deriving a candidate quantization step on the basis of the second coded data; and deriving the second quantization step on the basis of the candidate quantization step and the first quantization step.

11. A coded data transform method as claimed in claim 10, wherein in said deriving the second quantization step:

when the candidate quantization step has a value which is at least equal to the value of the first quantization step and smaller than twice the value of the first quantization step, a quantization step having the same value as that of the first quantization step or a quantization step having a value at least equal to twice the value of the first quantization step is derived as the second quantization step; and when the candidate quantization step has a value outside the range of being at least equal to the value of the first quantization step and smaller than twice the value of the first quantization step, the candidate quantization step is derived as the second quantization step.

12. A coded data transform method as claimed in claim 9, wherein:

said coding includes a first intra-frame coding utilizing correlation of pixel values in a frame and a first inter-frame coding utilizing correlation of pixel values between frames, wherein said first intra-frame coding includes a first intra-frame quantization while said first inter-frame coding includes a first inter-frame quantization;

said transcoding includes a second intra-frame coding utilizing correlation of pixel values in a frame and a second inter-frame coding utilizing correlation of pixel values between frames, wherein said second intra-frame coding includes a second intra-frame quantization while said second inter-frame coding includes a second inter-frame quantization;

said decoding includes an intra-frame decoding adapted to the intra-frame coding and an inter-frame decoding adapted to the inter-frame coding, wherein said intra-frame decoding includes an intra-frame inverse quantization while said inter-frame decoding includes an inter-frame inverse quantization; and said second quantization comprises:
   deriving the average of quantization steps of all coding units in the first intra-frame quantization as a first intra-frame average quantization step, deriving the average of quantization steps of all coding units in the second intra-frame quantization as a second intra-frame average quantization step, deriving the average of quantization steps of all coding units in the first inter-frame quantization as a first inter-frame quantization step, and deriving the average of quantization steps of all coding units in the second inter-frame quantization as a second inter-frame quantization step; and
   deriving the second quantization step on the basis of these average quantization steps and the transcoded data.

13. A coded data transform method as claimed in claim 12, wherein, in said second quantization step derivation, the second quantization step is derived so that the ratio of the second intra-frame average quantization step to the first intra-frame average quantization step is smaller than the ratio of the second inter-frame average quantization step to the first inter-frame average quantization step.

14. A transcoding system comprising:

a decoding unit operable to receive coded data obtained by subjecting image data of each coding unit to coding which includes a first orthogonal transform and a first quantization, and operable to decode the input coded data for each coding unit to generate decoded data; and an encoding unit operable to code the decoded data to generate transcoded data;

wherein said decoding unit comprises:
an inverse quantizer operable to inversely quantize quantized coefficients obtained from the input coded data with a first quantization step which has been used in the first quantization;

wherein said encoded unit comprises:
a frequency transform unit operable to subject the decoded data to a second orthogonal transform to generate frequency-domain data; and
a quantization device operable to subject the frequency-domain data to a second quantization with a second quantization step which is derived on the basis of the transcoded data and the first quantization step.

15. A transcoding system as claimed in claim 14, wherein:

said inverse quantizer is operable to perform inverse quantization corresponding to either intra-frame quantization or inter-frame quantization according to whether the coding process performed on the input coded data is either intra-frame coding or inter-frame coding, respectively; and said quantization device comprises:
a first step derivation unit operable to average the quantization steps of all coding units in the inverse quantization corresponding to the intra-frame quantization on the basis of the first quantization step supplied from said inverse quantizer, thereby deriving an intra-frame average quantization step;
a second step derivation unit operable to average the quantization steps of all coding units in the inverse quantization corresponding to the inter-frame quantization on the basis of the first quantization step supplied from said inverse quantizer, thereby deriving an inter-frame average quantization step; and
a quantization step derivation unit operable to derive a second quantization step on the basis of the transcoded data, the intra-frame average quantization step, and the inter-frame average quantization step;
wherein said quantization device is operable to quantize the frequency-domain data with the second quantization step.

16. A computer-readable recording medium comprising a data transform program operable to make a computer perform the coded data transform method as claimed in claim 9.

* * * * *